(12) United States Patent
Deng

(10) Patent No.: US 11,285,748 B2
(45) Date of Patent: Mar. 29, 2022

(54) DRIVE HEAD, DRIVE ASSEMBLY AND PROCESSING BOX

(71) Applicant: Ping Deng, Guangdong (CN)

(72) Inventor: Ping Deng, Guangdong (CN)

(73) Assignee: Zhuhai Kingly Technology Co., Ltd, Guangdong (CN)

( * ) Notice: Subject to any disclaimer, the term of this patent is extended or adjusted under 35 U.S.C. 154(b) by 564 days.

(21) Appl. No.: 16/335,558

(22) PCT Filed: May 25, 2017

(86) PCT No.: PCT/CN2017/085827
§ 371 (c)(1),
(2) Date: Aug. 23, 2019

(87) PCT Pub. No.: WO2017/202352
PCT Pub. Date: Nov. 30, 2017

(65) Prior Publication Data
US 2021/0206183 A1    Jul. 8, 2021

(30) Foreign Application Priority Data

May 26, 2016 (CN) .......................... 201610363907.3
Jul. 11, 2016 (CN) .......................... 201610546864.2
(Continued)

(51) Int. Cl.
*B41J 29/393* (2006.01)
*G03G 21/18* (2006.01)
*G06F 3/12* (2006.01)

(52) U.S. Cl.
CPC .......... *B41J 29/393* (2013.01); *G03G 21/186* (2013.01); *G06F 3/1204* (2013.01); *G06F 3/1242* (2013.01)

(58) Field of Classification Search
CPC ..... G03G 21/186; G03G 21/18; B41J 29/393; G06F 3/1204; G06F 3/1242
See application file for complete search history.

(56) References Cited

U.S. PATENT DOCUMENTS 9,091,995 B2 *  7/2015  Huang ............... G03G 21/1857
10,185,277 B1 *  1/2019  Wu ......................... F16D 1/112
(Continued)

FOREIGN PATENT DOCUMENTS

| CN | 202033588 | 11/2011 |
| CN | 103439871 | 12/2013 |

(Continued)

OTHER PUBLICATIONS

PCT/ISA/210 Search Report issued on PCT/CN2015/085827 pp. 8.
PCT/ISA/237 Written Opinion issued on PCT/CN2015/085827 pp. 9.

*Primary Examiner* — Francis C Gray
(74) *Attorney, Agent, or Firm* — The Farrell Law Firm, P.C.

(57) ABSTRACT

Provided is a drive head (40), a drive assembly (20), and a process cartridge (10), wherein the drive head (40) is mounted to a gear (12), the drive head (40) comprises a shaft part (16), a claw (15), and a first elastic element (14), and the shaft part (16) is sleeved by the claw (15) which can move stretchably along the shaft part. The drive head (40), drive assembly (20), and process cartridge (10) have the advantage that the drive head (40) is hard to falling off.

15 Claims, 19 Drawing Sheets

(30) Foreign Application Priority Data

Aug. 12, 2016 (CN) .......................... 201610664843.0
Oct. 8, 2016 (CN) .......................... 201621106361.5
May 18, 2017 (CN) .......................... 201720552186.0

(56) References Cited

U.S. PATENT DOCUMENTS

| | | | |
|---|---|---|---|
| 10,571,850 B2* | 2/2020 | Matsuoka | G03G 21/186 |
| 2008/0152388 A1 | 6/2008 | Ueno et al. | |
| 2010/0221036 A1 | 9/2010 | Hara et al. | |
| 2011/0217073 A1* | 9/2011 | He | G03G 15/757 |
| | | | 399/111 |
| 2015/0050048 A1* | 2/2015 | Huang | G03G 15/757 |
| | | | 399/167 |
| 2015/0050050 A1* | 2/2015 | Huang | G03G 21/1857 |
| | | | 399/167 |
| 2016/0282798 A1* | 9/2016 | Matsuoka | G03G 15/757 |
| 2018/0017933 A1* | 1/2018 | Zhou | G03G 15/0896 |
| 2018/0107154 A1* | 4/2018 | Wen | G03G 21/1864 |

FOREIGN PATENT DOCUMENTS

| | | |
|---|---|---|
| CN | 104570677 | 4/2015 |
| CN | 105573082 | 5/2016 |
| CN | 105785729 | 7/2016 |
| CN | 105974755 | 9/2016 |
| CN | 106094463 | 11/2016 |
| GN | 105319933 | 2/2016 |

\* cited by examiner

DRIVE HEAD, DRIVE ASSEMBLY AND PROCESSING BOX

PRIORITY

This application is a National Phase Entry of PCT International Application No. PCT/CN2017/085827, which was filed on May 25, 2017, and claims priority to Chinese Patent Application Nos. 201610363907.3, 201610546864.2, 201610664843.0, 201621106361.5 and 201720552186.0, which were filed on May 26, 2016, Jul. 11, 2016, Aug. 12, 2016, Oct. 8, 2016, and May 18, 2017, respectively, the content of each of which is incorporated herein by reference.

FIELD OF INVENTION

The following relates to a drive head, drive assembly and process cartridge.

BACKGROUND OF INVENTION

Typically, an image is formed on the printing medium by an image forming apparatus in accordance with an input image signal. For example, a printer, a copier, a fax machine and a multi-function peripheral (MFP) having all functions of the foresaid apparatus are all image forming apparatus.

Specifically, a desired image is formed by the image forming apparatus in following procedures. Firstly, a photosensitive drum is charged to a predetermined potential; a laser scanner emits laser beam onto the surface of the photosensitive drum so as to form an electrostatic latent image; a photographic developer is provided to the electrostatic latent image on the photosensitive drum by a develop roller and a visual image is thereby obtained. Secondly, the visual image developed on the photosensitive drum is transferred to a print medium directly or via an intermediate transfer medium. Lastly, the image is fixed on a print medium after a fixation process.

During the above procedures, a process cartridge of the image forming apparatus provides the photosensitive drum with photographic developer, such that a visual image can be formed on the surface of the photosensitive drum. The process cartridge typically has two types, i.e. an integrative cartridge and a split cartridge, wherein the integrative cartridge includes a toner container, a charging unit, a develop unit and a photosensitive drum, while a split cartridge is without a photosensitive drum. The process cartridge is removably mounted to the body of the image forming apparatus.

Typically, the process cartridge is driven by the image forming apparatus, via a photosensitive drum drive assembly assembled at one end of the photosensitive drum. The U.S. patent application US20080152388A1 discloses a process cartridge, wherein a structure of spherical universal joint is employed in the photosensitive drum drive assembly at one end of the photosensitive drum, but such drive structure has following defects: the spherical universal joint is likely to be out of the gear, and this is more likely to happen during transportation.

SUMMARY OF THE INVENTION

An aspect relates to a drive head, drive assembly and process cartridge, in order to solve the existing problem in the art that the drive head is likely to fall out. Embodiments of the present invention can be achieved by the following technical solutions:

A drive head, which can be mounted to the gear, the drive head comprises a shaft part, a claw and a first elastic element, the shaft part is sleeved in the claw which may stretchably move along the shaft part.

The shaft part comprises an "I"-shaped element, a body, and optionally a first portion.

The shaft part comprises a body and an "I"-shaped element provided at one end of the body, wherein the "I"-shaped element comprises two lugs connected by a connecting bar, thereby an "I"-shape is formed.

The claw comprises a supporting portion, two convex portions, and a connecting portion, wherein the connecting portion connects the supporting portion with the convex portions. The supporting portion is in contact with the first elastic element. A through hole, which sleeves the body of the shaft part, is provided centrally in the claw and extending through the supporting portion and the connecting portion. A recess for receiving the connecting bar is further provided at the one end of the connecting portion of the claw, which is close to the convex portion.

The convex portions are configured with a guiding surface and a limit stop, wherein the limit stop is in the shape of an acute angle.

In another aspect, the claw comprises a supporting portion, a connecting portion, and two convex portions. A recess is configured at one end of the connecting portion, which is close to the convex portion. The two convex portions are connected at the top end thereof by a ring. The shaft part comprises a body and lugs provided at one end of the body, wherein the lugs may be engaged with the recess of the claw.

The convex portion extends inwardly to form a protruding wall.

A drive assembly, which may be removably mounted to a process cartridge comprising a protective cover, the drive assembly comprises any one of the above described drive heads which is mounted to a gear, and the drive assembly also comprises a pushing device which is in contact with the claw that may be forced by the pushing device to move stretchably along the shaft part.

The pushing device comprises a pushing rod and a second elastic element, wherein the second elastic element is in contact with the protective cover and the pushing rod respectively.

The pushing rod comprises a pushing end, a fulcrum, and a force bearing end. The distance between the edge of the pushing end and the fulcrum is L1, while the distance between the edge of force bearing end and the fulcrum is L2, and $L1/L2 \geq 2$.

A process cartridge comprises any one of the above described drive assemblies.

A process cartridge comprises a cartridge body, a protective cover, and a gear train located under the protective cover. The gear train comprises an intermediate gear, a develop roller gear, and a supply roller gear, the intermediate gear is engaged with the develop roller gear as well as the supply roller gear respectively. The process cartridge further comprises any one of the above described driving heads which is connected with the intermediate gear.

The process cartridge further comprises a pushing device, the pushing device comprises a pushing block and a pushing rod connecting with the block, wherein the pushing rod is in contact with the drive head, the pushing block is configured with a hook for receiving drive force from the image forming apparatus.

Elastic elements are provided on the pushing block and pushing rod, respectively.

The pushing device comprises a first pushing block, a second pushing block and a pushing rod connecting with the first pushing block and the second pushing block respectively, wherein the pushing rod is in contact with the drive head, the pushing block is configured with a hook for receiving drive force from the image forming apparatus.

Elastic elements are provided on the second pushing block and pushing rod, respectively.

The drive head, drive assembly and process cartridge provided by the present invention require a not-so-high precision of the drive head and solve the problems in prior art that the drive head is easily falling off.

Other features and advantages of the present invention will be described in the following, and will partly be apparent from the description, or can be learned by the embodiments below. The objective and other advantages of the disclosure can be achieved by the features specified in the description, the claims and the accompanying drawings.

BRIEF DESCRIPTION OF DRAWINGS

Embodiments of the invention will be described in detail, with references to the following figures. Apparently, some other drawings may be acquired in view of these drawings without any creative work.

DETAILED DESCRIPTION OF THE INVENTION

Figure 1:
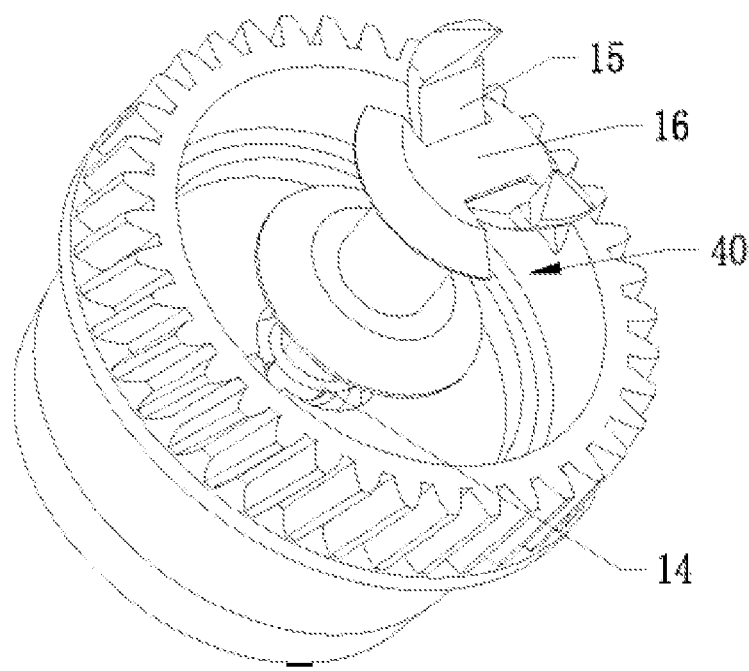
FIG. 1 is a structural schematic view of a drive assembly according to Embodiment 1 of the present invention.
Figure 2:
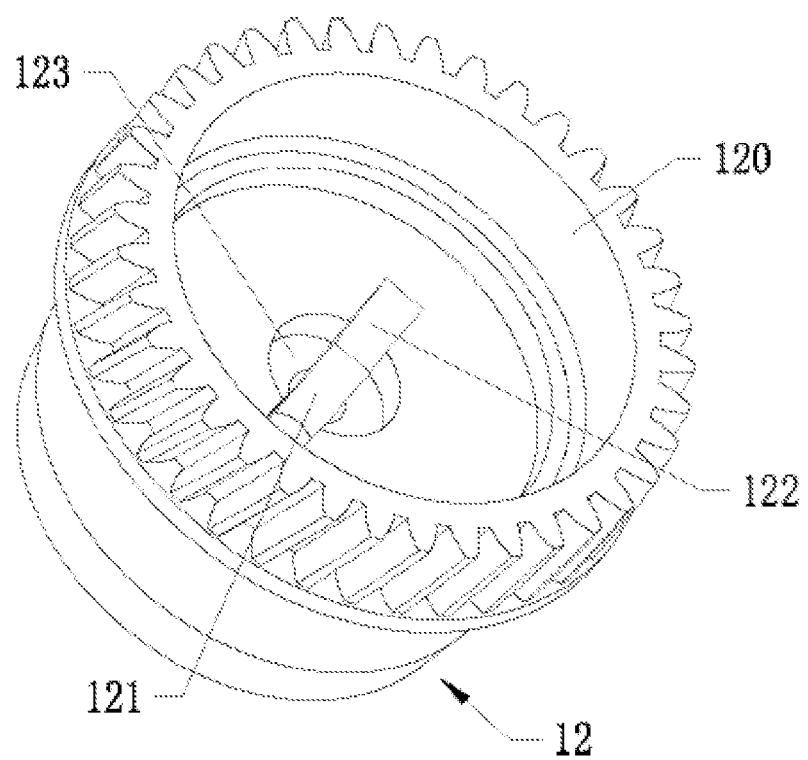
FIG. 2 is a structural schematic view of a gear according to Embodiment 1 of the present invention.
Figure 3:
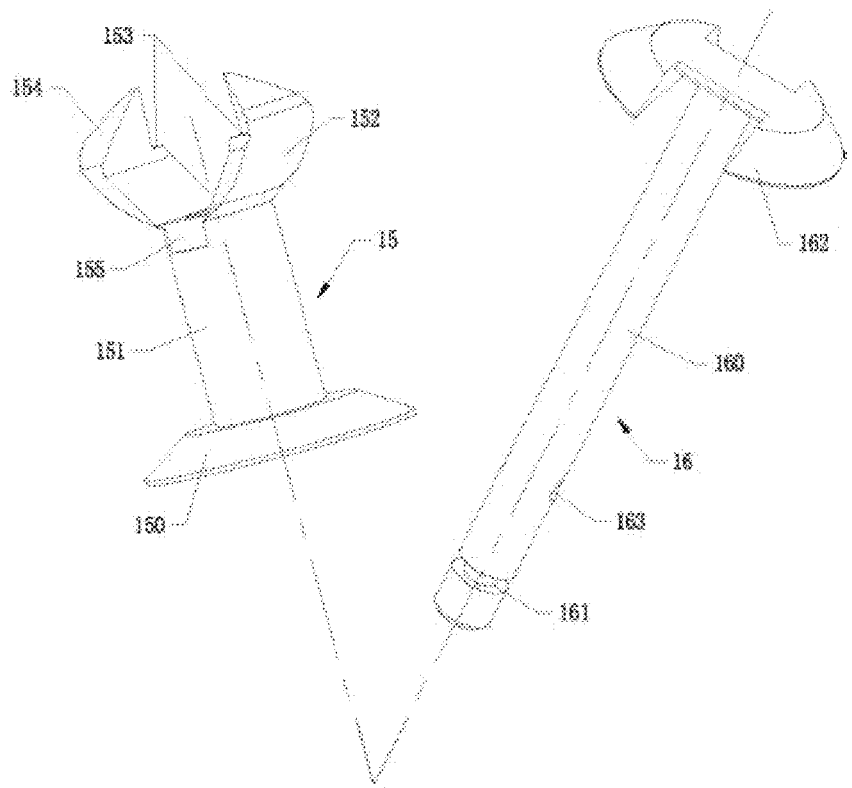
FIG. 3 is an exploded view of a drive head according to Embodiment 1 of the present invention.
Figure 4:
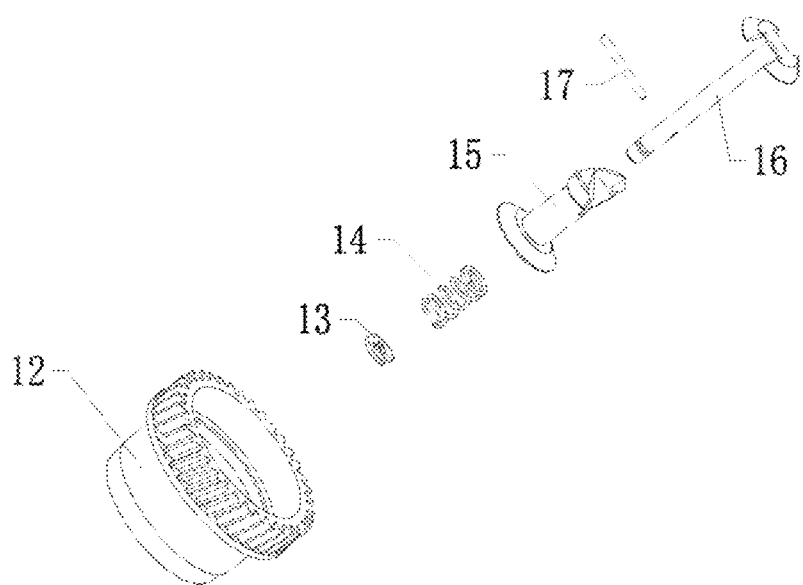
FIG. 4 is a structural exploded view of a drive assembly according to Embodiment 1 of the present invention.
Figure 5:
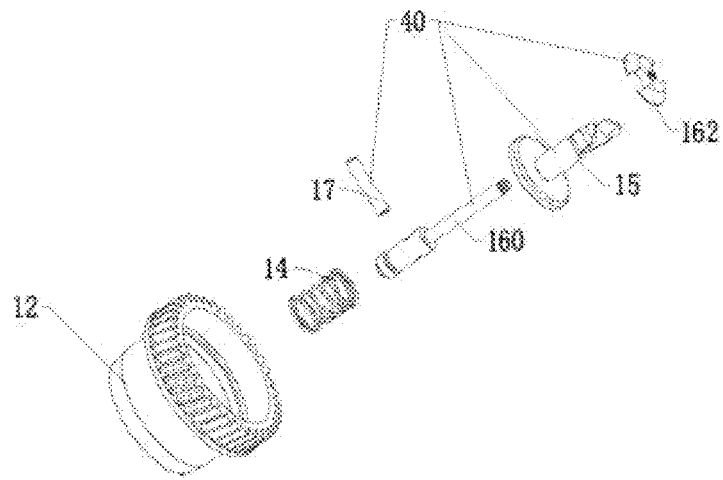
FIG. 5 is an alternative structural exploded view of a drive assembly according to Embodiment 1 of the present invention.

Technical solutions from embodiments of the present invention will be described in details hereafter with reference to the accompany drawings, in order to explain the objectives, technical solutions, and the advantages of embodiments of the present invention explicitly. Apparently, the described embodiments below are some embodiments of the present invention, instead of all embodiments. Any non-substantive, obvious alterations or improvement by the technician of this technical field according to the present invention may be incorporated into ambit of claims of the present invention.

Embodiment 1

As illustrated in FIG. 1 to FIG. 6, a drive head comprises a first elastic element 14, a shaft part 16 and a claw 15 sleeving the shaft part 16. The claw 15 can move up and down stretchably along the shaft part 16.

The shaft part 16 comprises a body 160 whose one end is configured with a groove 161 while another end is configured with an "I"-shaped element 162 comprising at least two lugs which are connected each other by a connecting bar, and the "I"-shaped element 162 extends along the direction perpendicular to the axis of the body 160. A first hole 163 is provided in the shaft part 16. The body 160 and the "I"-shaped element 162 may be integrally molded, or may be separated but connected by means of a thread and a screw such that the body 160 and "I"-shaped element 162 can be readily molded respectively.

The claw 15 comprises a supporting portion 150, a connecting portion 151, and two convex portions 152, wherein the connecting portion 151 connects the supporting portion 150 to the convex portions 152. The supporting portion 150 and two convex portions can all extend away from the connecting portion 151 along the direction perpendicular to the axis of the claw so as to have a larger dimension than the connecting portion 151. A first elastic element 14 is connected to one surface of the supporting portion 150, while a pushing device contacts its opposite surface which is an arc or a slope. A through-hole is formed in the center of both the supporting portion 150 and the connecting portion 151. The connecting portion 151 is further configured with a recess 155 near the convex portions 152 for receiving the connecting bar. Each of the convex portions has a guiding face 154 and a limit stop 153, wherein the limit stop 153 forms an acute angle with the plane perpendicular to the axis of the connecting portion 151.

The drive head further comprises a circlip 13 and a pin 17. The circlip 13 is fitted into the groove 161 to secure the shaft part 16 after the shaft part 16 being mounted to a gear 12. The pin 17 is inserted into the first hole 163 such that the drive force from the shaft part 16 can be transmitted to the gear 12.

The gear 12 for photosensitive drum is configured with a shaft hole 121 in its center, and on the side of the gear 12 facing the claw, a part of the shaft hole 121 extends outwardly, forming a shoulder 123 for supporting one end of the first elastic element 14, and a guide slot 122 for receiving the pin 17.

Figure 6:
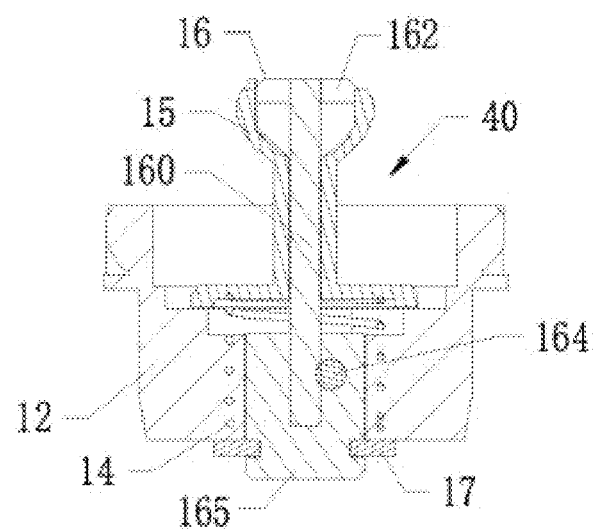
FIG. 6 is a cross-sectional view of the drive assembly according to Embodiment 1 of the present invention.

As illustrated in FIG. 6, the drive head alternatively comprises a shaft part 16, a claw 15, a first pin 17 arranged in the shaft part 16, and a first elastic element 14 abutting against the gear 12 and the claw 15 respectively. The claw 15 sleeves on the shaft part 16, and may move up and down stretchably along the shaft part 16. The shaft part 16 comprises an "I"-shaped element 162, a body 160, and a first portion 165. "I"-shaped element 162 and the body 160 may be molded integrally or separately. The first portion 165, which is sleeved in the body 160, is configured with a shaft hole for mounting the body 161 and a lock hole for securing the first portion 165 with the body 160. At least a part of the body 160 is uncovered when seen from the lock hole (wherein the lock hole is not coaxial with the center axis of the body 160). The shaft part 16 further comprises a second pin 164 inserted in the lock hole, and thus locks up the body 160 of the shaft and the first portion 165 under the condition of interference fit.

Embodiment 2

Figure 7:
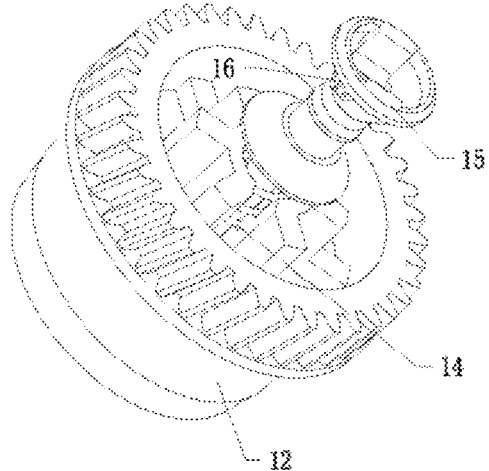
FIG. 7 is a structural schematic view of a drive assembly according to Embodiment 2 of the present invention.
Figure 8:
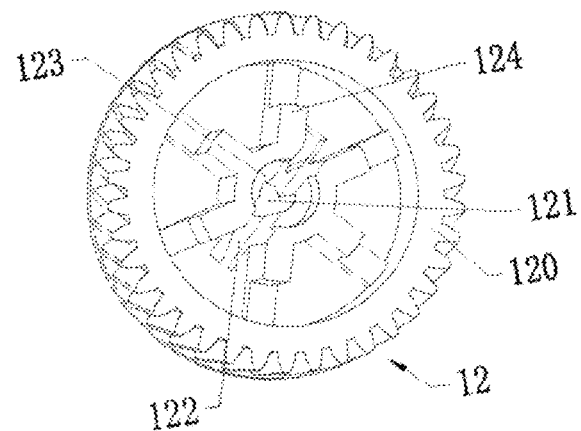
FIG. 8 is a structural schematic view of a gear according to Embodiment 2 of the present invention.
Figure 9:
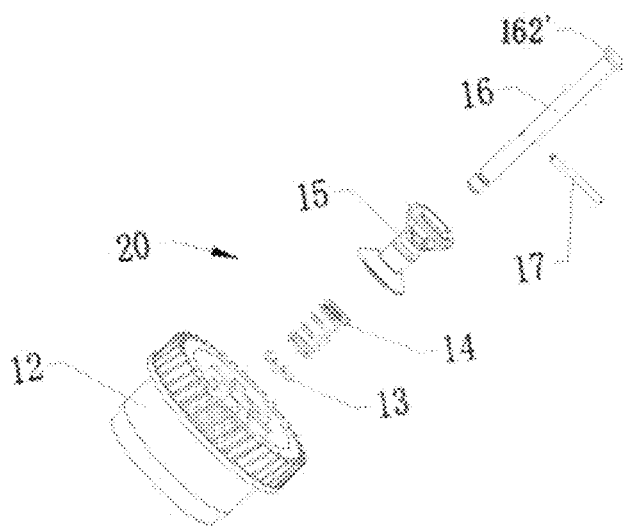
FIG. 9 is an exploded view of the drive assembly according to Embodiment 2 of the present invention.
Figure 10:
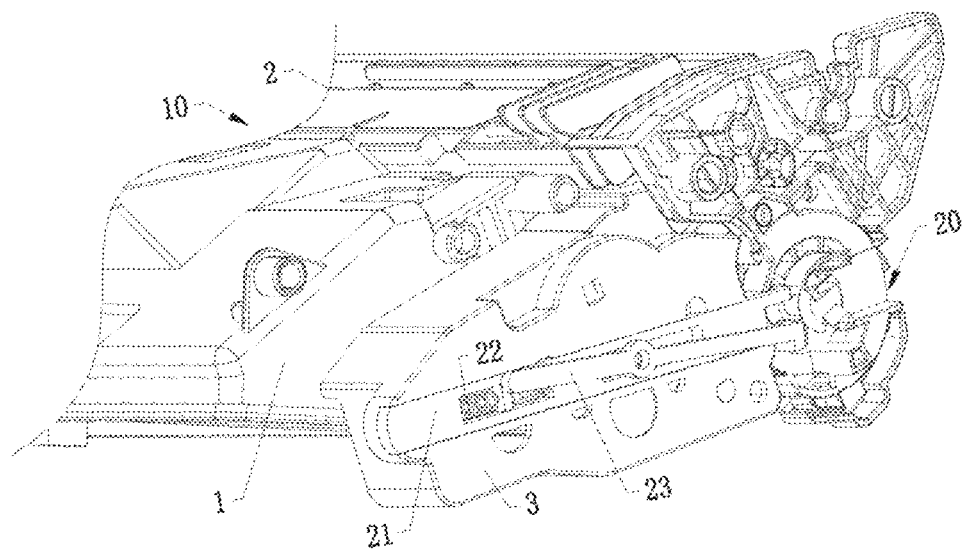
FIG. 10 is a structural schematic view of a process cartridge according to Embodiment 3 of the present invention.
Figure 11:
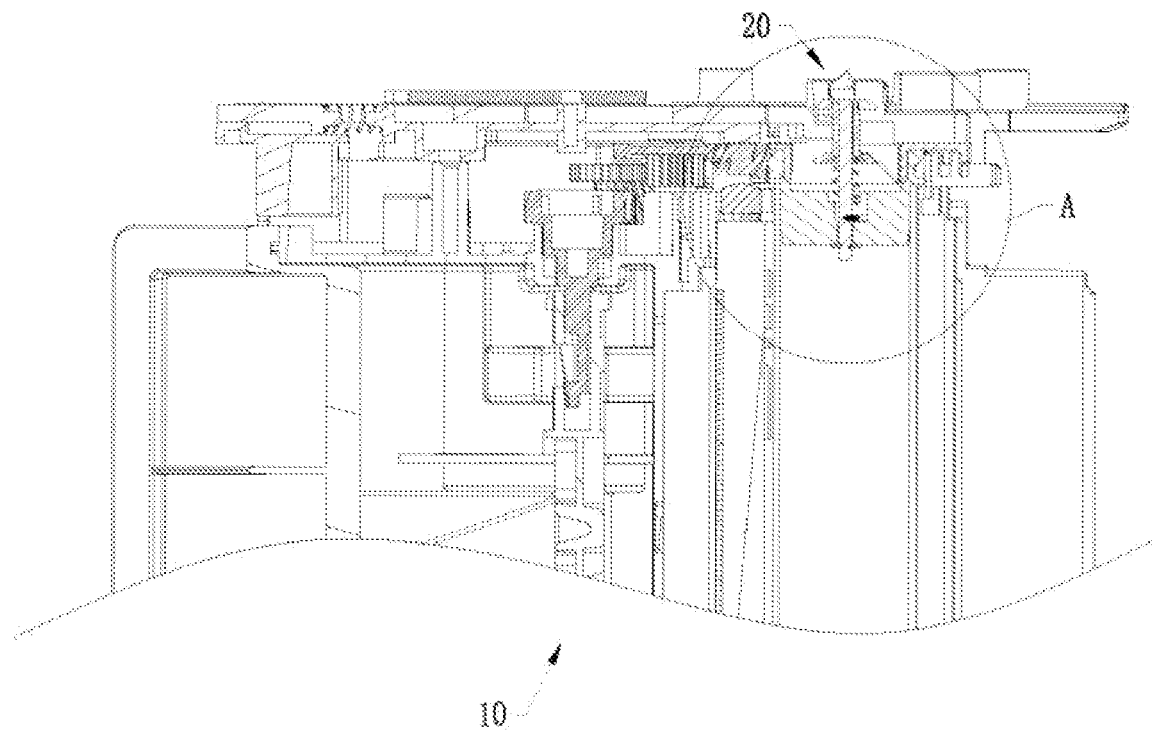
FIG. 11 is a cross-sectional view of the process cartridge according to Embodiment 3 of the present invention.
Figure 12:
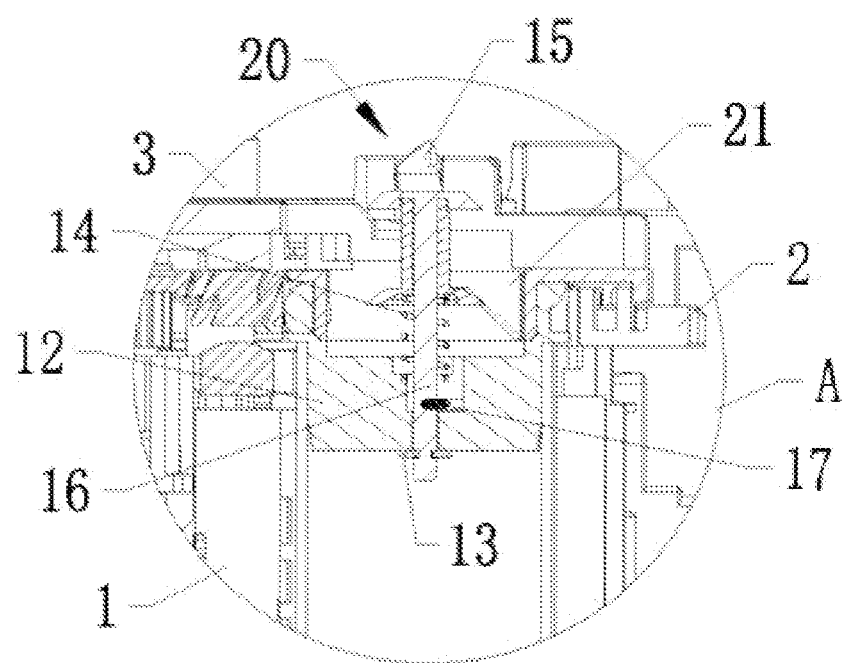
FIG. 12 is a partial enlarged view of the portion A in FIG. 11.
Figure 13:
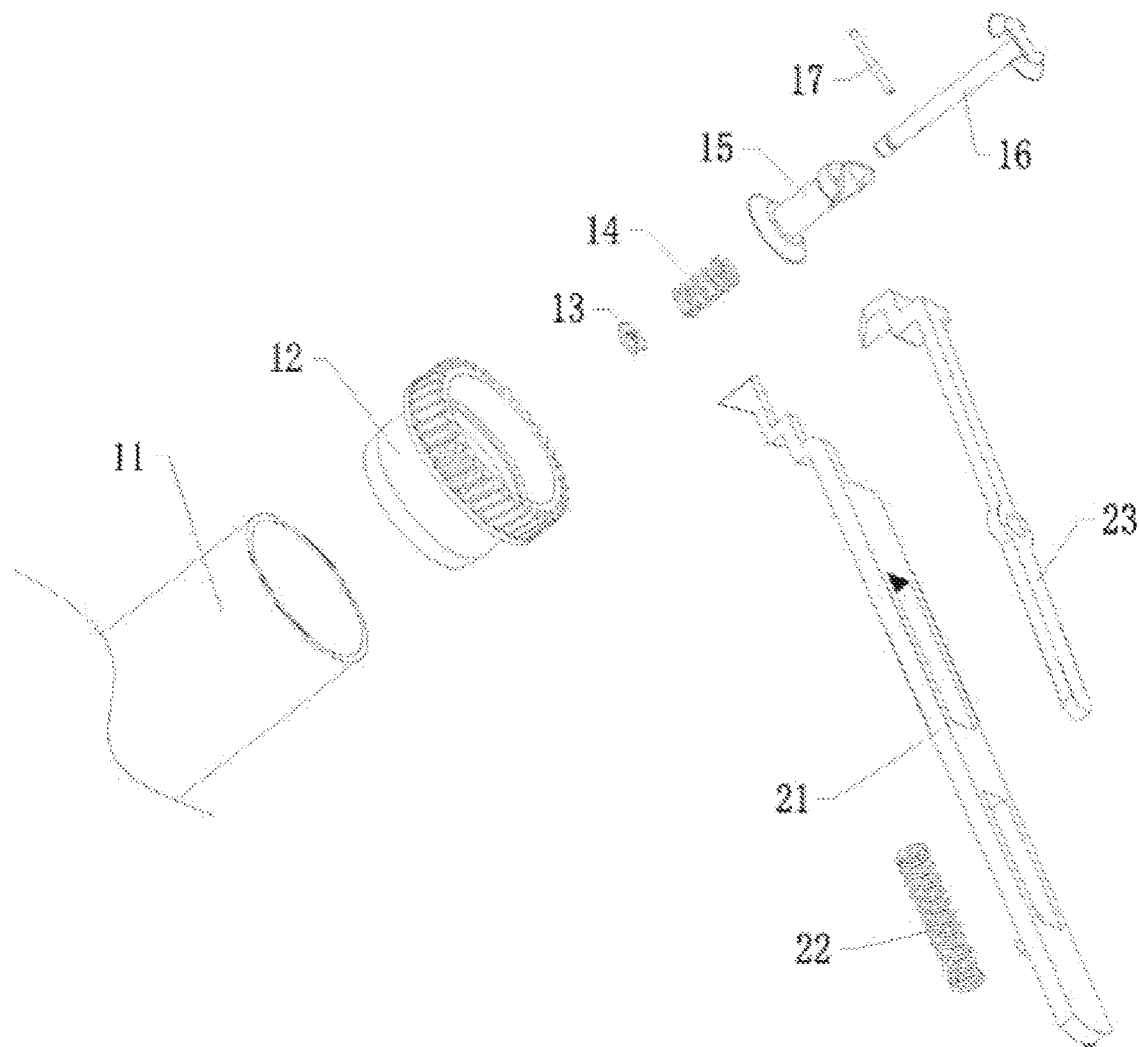
FIG. 13 is an exploded view of the process cartridge according to Embodiment 3 of the present invention.
Figure 14:
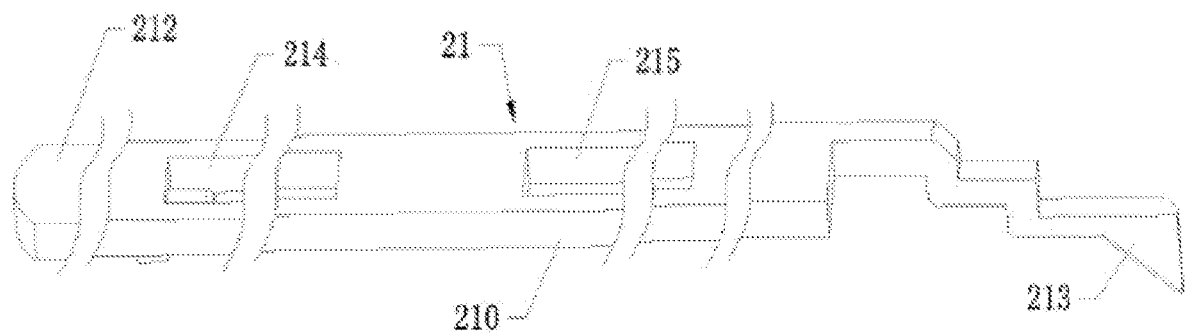
FIG. 14 is a structural schematic view of a pushing block according to Embodiment 3 of the present invention.
Figure 15:
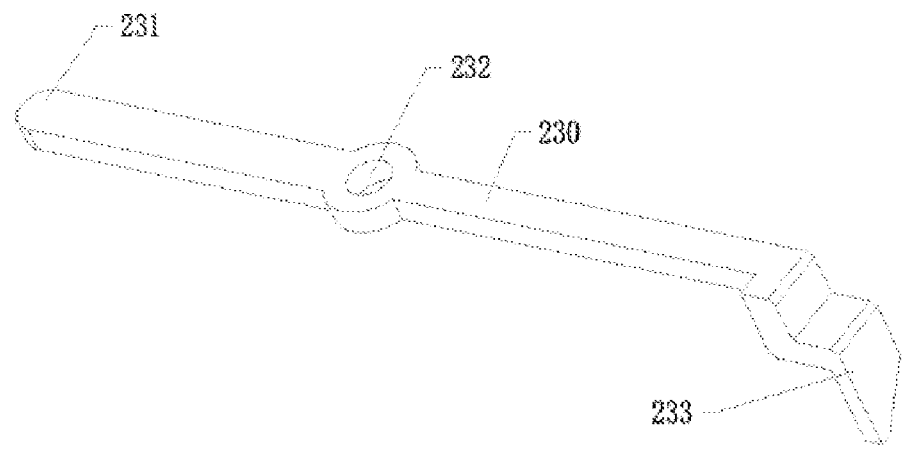
FIG. 15 is a structural schematic view of a pushing rod according to Embodiment 3 of the present invention.

There are same structures between this embodiment and the above described embodiment, which will not be repeated herein. As illustrated in FIG. 7 to FIG. 9, the different structure therebetween is in the drive head.

Specifically, the drive head comprises a claw 15 and a shaft part 16. The claw 15 is configured with two convex portions 152 which are connected at the top end thereof by a ring, and the convex portion extends inwardly to form a protruding wall for receiving the drive force from the force transmitting component in the drive head of an image forming apparatus.

A groove 161 is configured at one end of the shaft part 16, and a protruding block 162' is configured at the other end. The protruding block 162' is inserted into a recess in the claw 15 to receive the drive force from the claw 15.

The differences for the gear 12, between this Embodiment and Embodiment 1, is that, the gear 12 in Embodiment 1 is in contact with the supporting portion of the claw through a plane surface, while the gear 12 in this embodiment is through a plurality of ribs. However, these two types of gear 12 are interchangeable between the foresaid two Embodiments.

Embodiment 3

As illustrated in FIG. 10 to FIG. 15, a process cartridge 10 according to this Embodiment comprises a waste toner container 2 and a toner container 1. The waste toner container 2 comprises a photosensitive drum which is configured with a gear 12 and a drive assembly 20 for receiving the drive force from an image forming apparatus. A protective cover 3 for supporting and protecting the gear train (not shown) is provided on the side where a drive assembly for photosensitive drum 20 in the process cartridge is arranged. The gear train comprises a develop roller gear and a supply roller gear etc.

The drive assembly for photosensitive drum 20 comprises a drive head arranged on the photosensitive drum gear 12 and a pushing device arranged on the protective cover. The structure of the drive head has been described in the Embodiment 1 and the Embodiment 2, therefore it will not be repeated in details herein.

The pushing device comprises a pushing rod 21 and a second elastic element 22, wherein the pushing rod 21 comprises a first slot 214, a second slot 215, a first end 212 and a second end 213. The first end 212 is configured for receiving pushing force from the image forming apparatus, such as a cover of the image forming apparatus. The second end 213 is in contact with the supporting portion 150 of the claw 15, where an arc-shaped guiding surface is arranged. The second elastic element 22, which is in contact with the pushing rod 21 and the protective cover 3 respectively, is arranged in the first slot 214. In normal operation, the pushing rod 21 moves towards the first end 212 under the action of the second elastic element 22, and the pushing rod 21 moves towards the second end 213 when the first end 212 receives a pushing force from the cover of the image forming apparatus and overpower the action of the second elastic element 22.

The pushing device further comprises a lever 23. The lever 23 comprises a lever body 230, a second hole 232 arranged in the lever body 230, a third end 231 and a fourth end 233. The third end 231 may receive the lift force from the track on the image forming apparatus, while the fourth end 233 may be in contact with the supporting portion 150. The second hole 232 and the second slot 215 are mounted to a lug boss on the protective cover, and the second slot 215 has a larger dimension than the second hole 232.

The lever 23 is configured for overcoming the engagement force between the claw 15 and the image forming apparatus. Specifically, if the process cartridge 10 is going to be removed from the image forming apparatus, firstly, the process cartridge 10 needs to be lifted up, the third end 231 of the lever 23 contacts the track of the image forming apparatus and thereby applies a lift force to the track, the track creates a counter-force to the lever, leading to a downward movement of the third end 231 of the lever, and accordingly a upward movement of the fourth end 233, the fourth end 233 will create a force acting on the supporting portion 150 towards the photosensitive drum gear 12 due to the contact between the fourth end and the supporting portion 150, so as to make the limit stop 153 separated from the drive head of the image forming apparatus.

Figure 16:
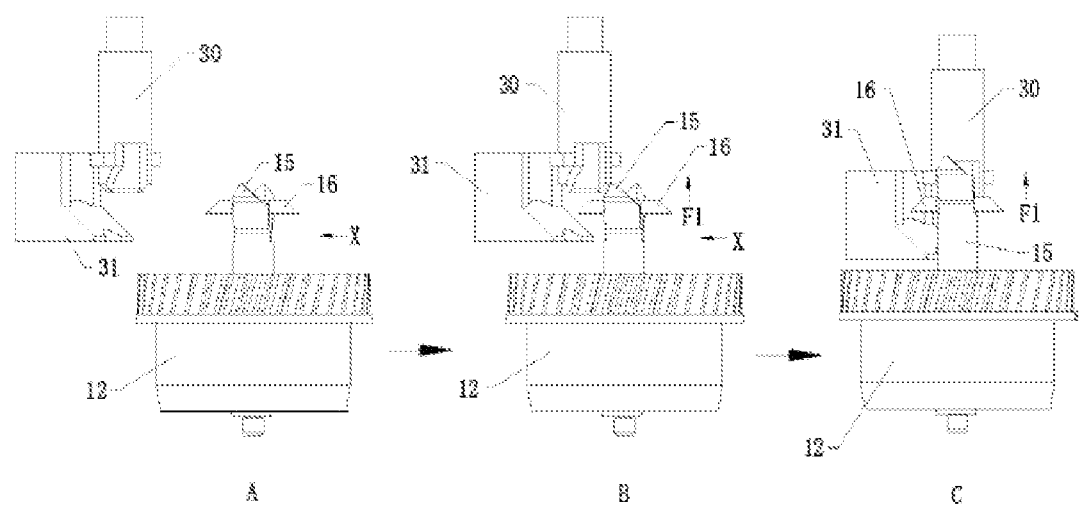
FIG. 16 is a view illustrating a transformation for an assembly process or a state of motion from non-working state to working state of a drive assembly according to the present invention.
Figure 17:
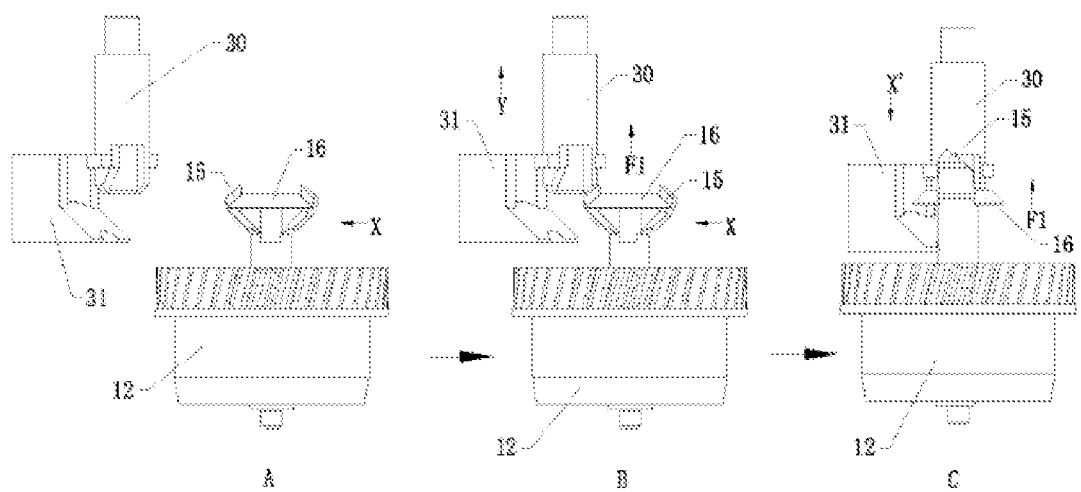
FIG. 17 is a view illustrating another transformation for an assembly process or a state of motion from non-working to working of a drive assembly according to the present invention.

FIG. 16 is a serial view illustrating states of motion for mounting a process cartridge of this embodiment to the image forming apparatus, and FIG. 17 is a serial view illustrating alternative states of motion for mounting a process cartridge of this embodiment to the image forming apparatus. As illustrated in FIG. 16 and FIG. 17, sub-figure A shows the state before the drive head of photosensitive drum is in contact with the drive head 30 of the image forming apparatus, sub-figure B shows the state when the drive head of photosensitive drum contacts the drive head 30 of the image forming apparatus, sub-figure C shows the state in normal operation. When starting to install the process cartridge 10, the user firstly applies a force to push the drive head of the process cartridge in the X direction as shown, after the drive head of the process cartridge touches the drive head of the image forming apparatus, the claw 15 and the drive head 30 of the image forming apparatus may move in opposite direction due to the foresaid pushing force, wherein the drive head 30 of the image forming apparatus moves a distance of about 2 mm, and the claw 15 retracts a distance greater than 3 mm, preferably at 4.5 mm. Once drive head 30 of the image forming apparatus is installed in a working position under the effect of the pushing force and the guiding surface 154, the cover of the image forming apparatus is closed and creates a pushing force to the pushing rod 21 such that the pushing rod 21 will no longer offset the force F1 generated by the first elastic element 14. As the effect of F1 of the elastic element 14, the claw 15 will move towards the drive head 30 of the image forming, while the drive head 30 of the image forming apparatus will move towards the claw 15, then the drive head 30 of the image forming apparatus rotate to a predetermined position where the force transmitting component in the drive head 30 of the image forming apparatus turns to a position corresponding to the "I"-shaped element 162, both the drive head 30 of the image forming apparatus and the claw 15 reach to the working position, and the drive head 30 of the image forming apparatus keeps rotating, so as to drive the claw 15 rotate as well because of the engagement of the force transmitting component with the limit stop 153. The claw transmits the force to the shaft part 16 by the engagement of the "I"-shaped element 162 and the recess 155, and subsequently, the shaft part 16 transmits the force to the gear 12 of photosensitive drum.

Figure 18:
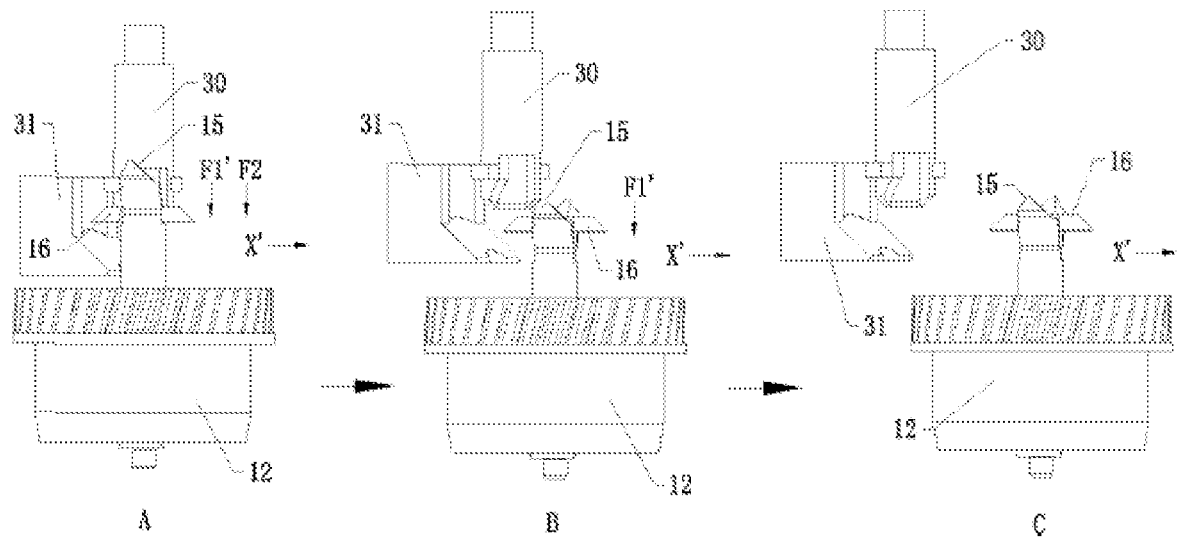
FIG. 18 is a view illustrating a disassembly process of a drive assembly or a transformation when it is under the state of non-working according to the present invention.

FIG. 18 is a serial view illustrating states of motion for dismounting a process cartridge from the image forming apparatus. As illustrated in FIG. 18, the limit stop 153 may be departed from the force transmitting component in the drive head of the image forming apparatus due to effect of the force F1', F2' from the pushing device, so that the process cartridge 10 can be removed from the image forming apparatus.

In the above described states of motion, the described gear 12 is a gear 12 of photosensitive drum, however, it can also be an intermediate gear. The described pushing force to push the drive head is a force which the pushing rod 21 receives from the cover of the apparatus, however, the force may also be received from other locations to push the drive head. The intermediate gear and pushing forces received from other locations will be explained in the following embodiments hereafter.

Embodiment 4

Figure 19:
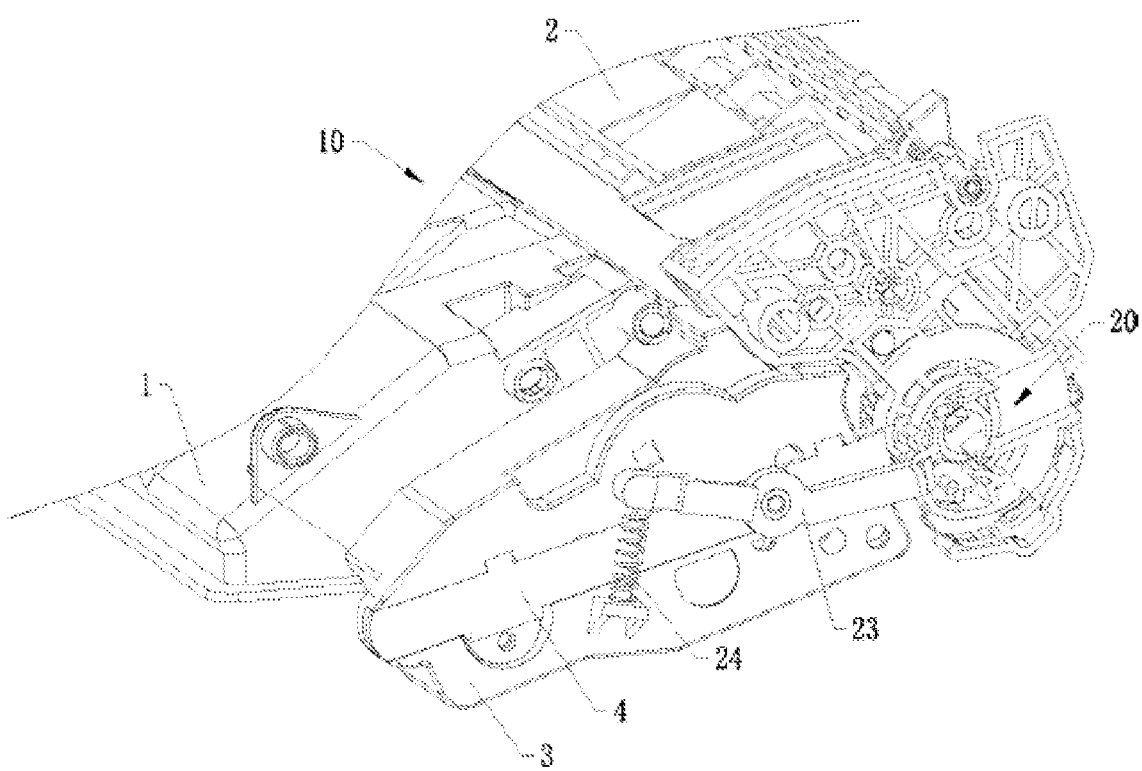
FIG. 19 is a structural schematic view of a process cartridge according to embodiment 4 of the present invention.
Figure 20:
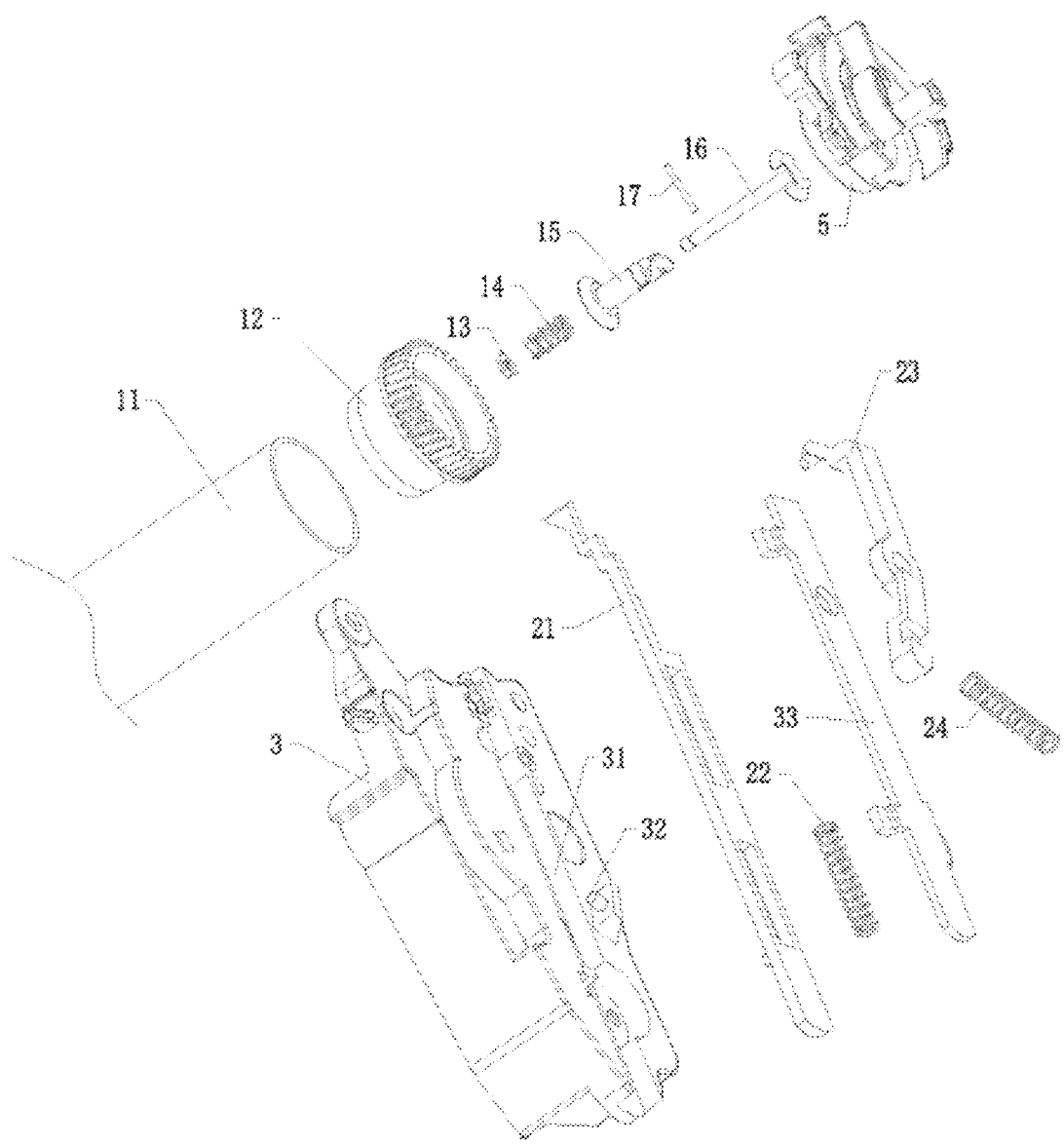
FIG. 20 is an exploded view of the process cartridge according to Embodiment 4 of the present invention.
Figure 21:
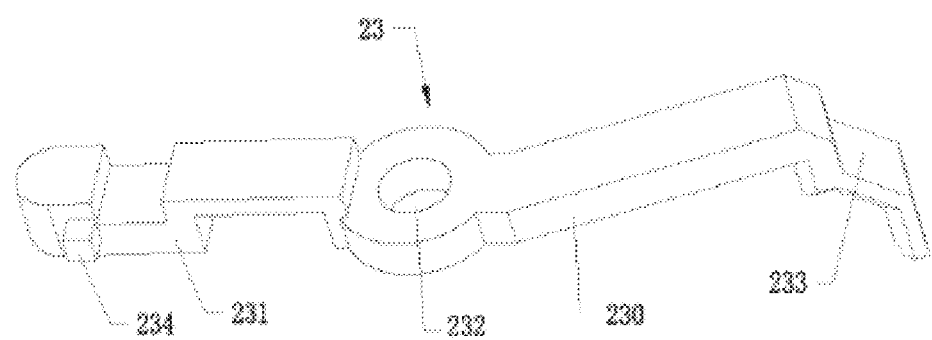
FIG. 21 is a structural schematic view of a pushing block according to Embodiment 4 of the present invention.
Figure 22:
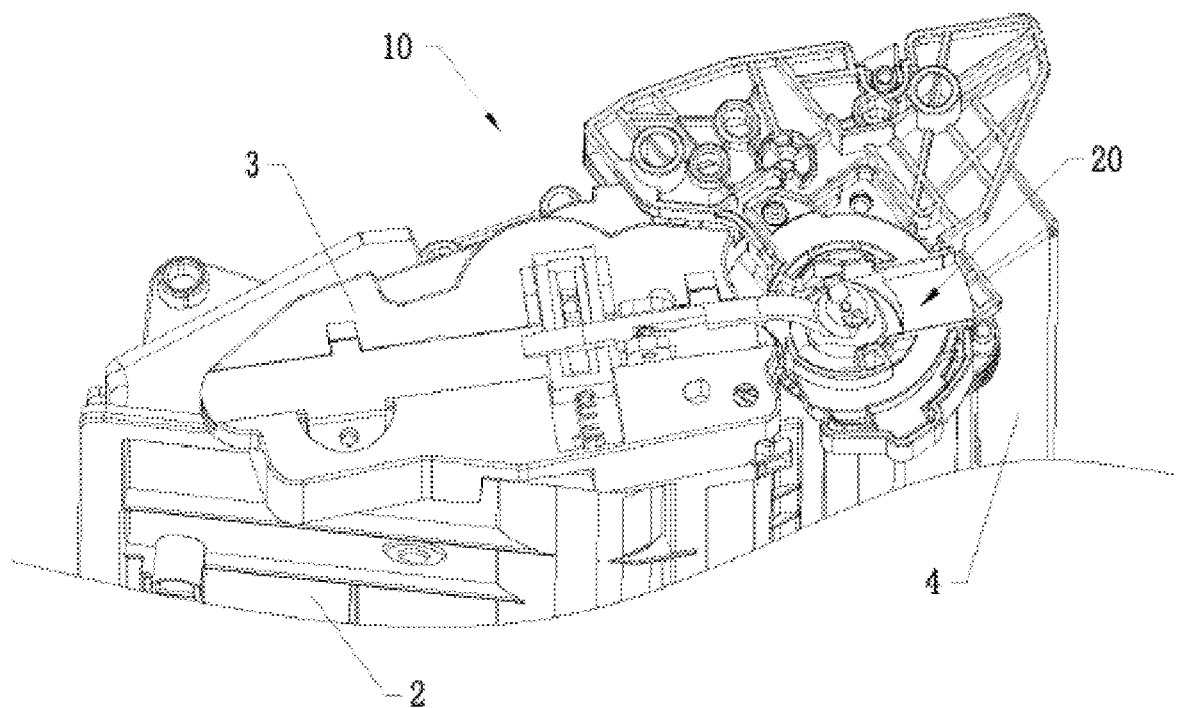
FIG. 22 is a structural schematic view of a process cartridge according to Embodiment 5 of the present invention.
Figure 23:
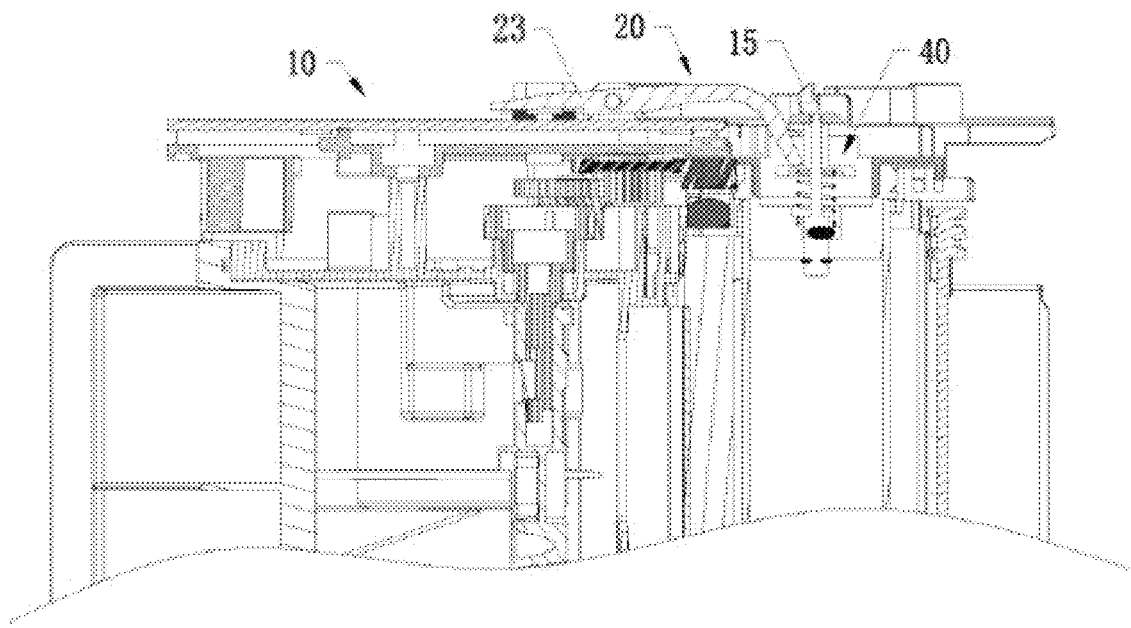
FIG. 23 is a cross-sectional view of the process cartridge according to Embodiment 5 of the present invention.
Figure 24:
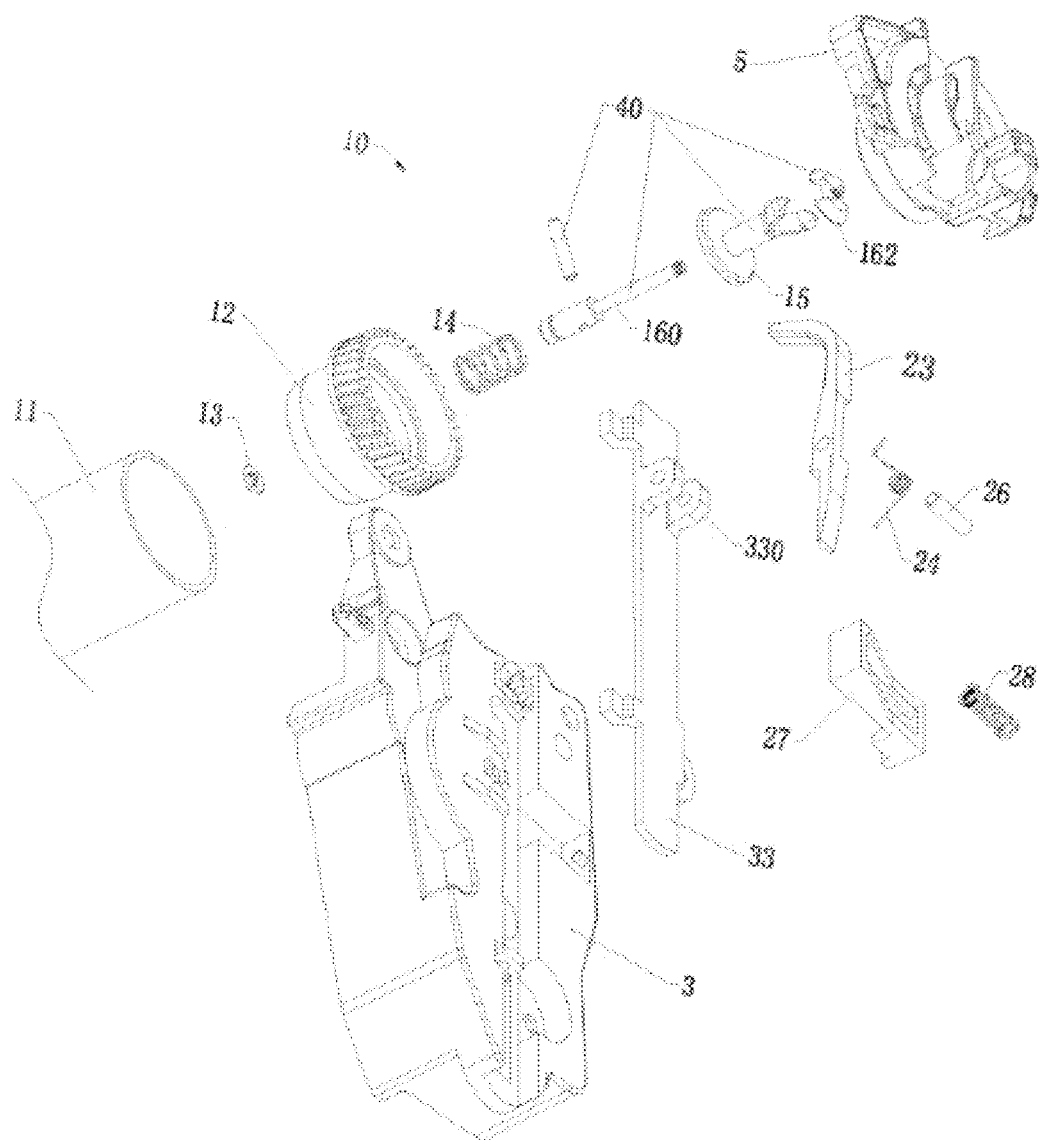
FIG. 24 is an exploded view of the process cartridge according to Embodiment 5 of the present invention.
Figure 25:
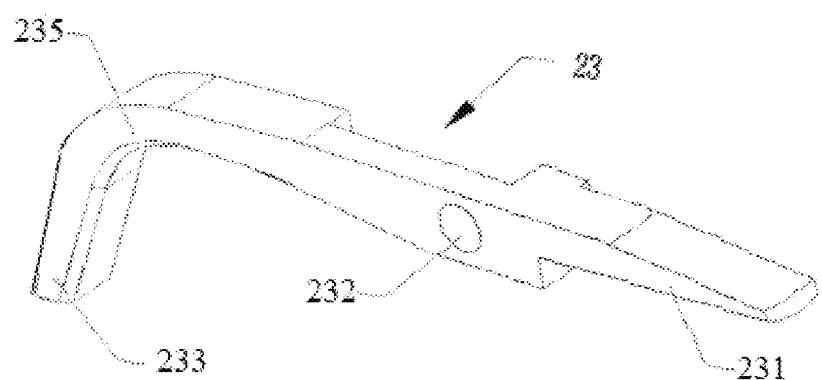
FIG. 25 is a structural schematic view of a lever according to Embodiment 5 of the present invention.
Figure 26:
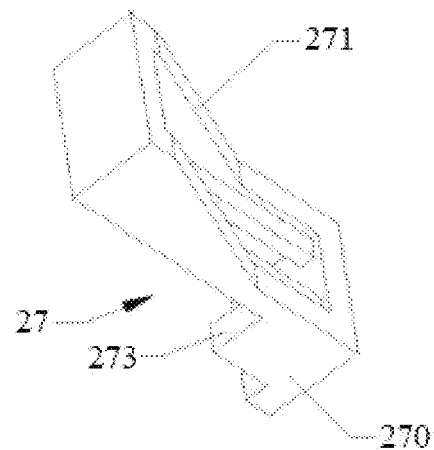
FIG. 26 is a structural schematic view of a sliding block according to Embodiment 5 of the present invention.

As illustrated in FIG. 19 to FIG. 21, the identical structures between this embodiment and the above described embodiments will not be explained here again, and their difference lies in the pushing device. The pushing device according to this embodiment comprises a pushing rod 21 and a lever 23. the protective cover 3 is configured with a channel 31 for accommodating the pushing rod 21, and a barrier plate 33 for shading the channel 31 after the pushing rod 21 was installed. The barrier plate 33 is configured with at least one snap and screw hole for mounting and securing the pushing rod 21 and the lever 23.

The pushing device comprises a pushing rod 21 and a second elastic element 22, wherein the pushing rod 21 comprises a first slot 214, a second slot 215, a first end 212, and a second end 213. The first end 212 is configured for receiving a pushing force from a part of the image forming apparatus, such as a cover of the image forming apparatus. The second end 213 is in contact with the supporting portion 150 of the claw 15 where an arc-shaped guiding surface is set up. The second elastic element 22 is arranged within the first slot 214, in contact with the pushing rod 21 and the protective cover 3 respectively. In normal state, the pushing rod 21 moves toward the first end 212 under the action of the second elastic element 22, and the pushing rod 21 moves toward the second end 213 after the first end 212 receives a pushing force from the cover of the image forming apparatus.

The pushing device further comprises a lever 23 and a third elastic element 24. The lever 23 comprises a lever body 230, a second hole 232 arranged in the lever body 230, and its two ends (a third end 231 and a fourth end 233). The third end 231 may receive the lift force from the track on the image forming apparatus, while the fourth end 233 may be in contact with the supporting portion 150. The second hole 232 and the second slot 215 are mounted to a lug boss on the protective cover, and the second slot 215 has a larger dimension than the second hole 232.

The third elastic element 24 has two ends being respectively connected to a supporting block 32 arranged on the protective cover 3, and a bump 234 arranged at the third end 231 of the lever 23. With the effect of the third elastic element 24, the lever 23 stays at the initial location without the action of external forces.

Embodiment 5

As illustrated in FIG. 22 to FIG. 26, the difference between this embodiment and the above described embodiments lies in the pushing device. The pushing device comprises a lever 23 arranged on the protective cover 3, a sliding block 27 and elastic elements.

The lever 23 comprises a force bearing end (third end) 231, a bend portion 235, a pushing end (fourth end) 233 provided at a front end of the bend portion 235, and a fulcrum (second hole) 232. The sliding block 27 comprises a lower supporting portion 270, an upper supporting portion 273, and a sloping surface 271.

The elastic elements comprise a third elastic element 24 provided at the lever and a fourth elastic element 28 connected with the sliding block 27.

The lever 23 is mounted on the barrier plate 33 by supporting holes 330 and a supporting shaft 26 which is sleeved by a third elastic element 24. The lever 23 may have a motion around the fulcrum 232. A fourth elastic element 28 may be arranged inside the sliding block 27 and be in contact with a supporting spot on the protective cover 3 such that the sliding block 27 may move up and down over the protective cover 3. The sloping surface 271 of the sliding block 27 is in contact with the force bearing end 231 of the lever 23. The upper supporting portion 273 of the sliding block 27 may receive forces from the track of the image forming apparatus.

With the effect of the force from the track of the image forming apparatus, the upper supporting portion 273 of the sliding block 27 overcomes the force from the fourth elastic element 28 to force the sliding block 27 move down. The lever 23 overcomes the force of the third elastic element 24 under the force from the sloping surface 271, then the pushing end (fourth end) 233 of the lever 23 moves toward the gear 12 of photosensitive drum (while the force bearing end (third end) 231 moves away from the protective cover 3), so that the convex portion 152 of the claw 15 is moved to a location being substantially parallel to the "I"-shaped element 162 in order to mount or remove the drive head 40 successfully.

The lever 23 is configured for overcoming an engagement force between the claw 15 and the image forming apparatus. Specifically, if the process cartridge 10 is going to be removed from the image forming apparatus, firstly, the process cartridge 10 needs to be lifted up, the third end 231 of the lever 23 abuts against the track of the image forming apparatus and thereby applies a lift force to the track, the track creates a counter-force to the lever, leading to a downward movement of the third end 231 of the lever, accordingly a upward movement of the fourth end 233, then the fourth end 233 creates a force acting on the supporting portion 150, towards the photosensitive drum gear 12, due to their interaction, so as to make the limit stop 153 separated from the drive head of the image forming apparatus.

Embodiment 6

Figure 27:
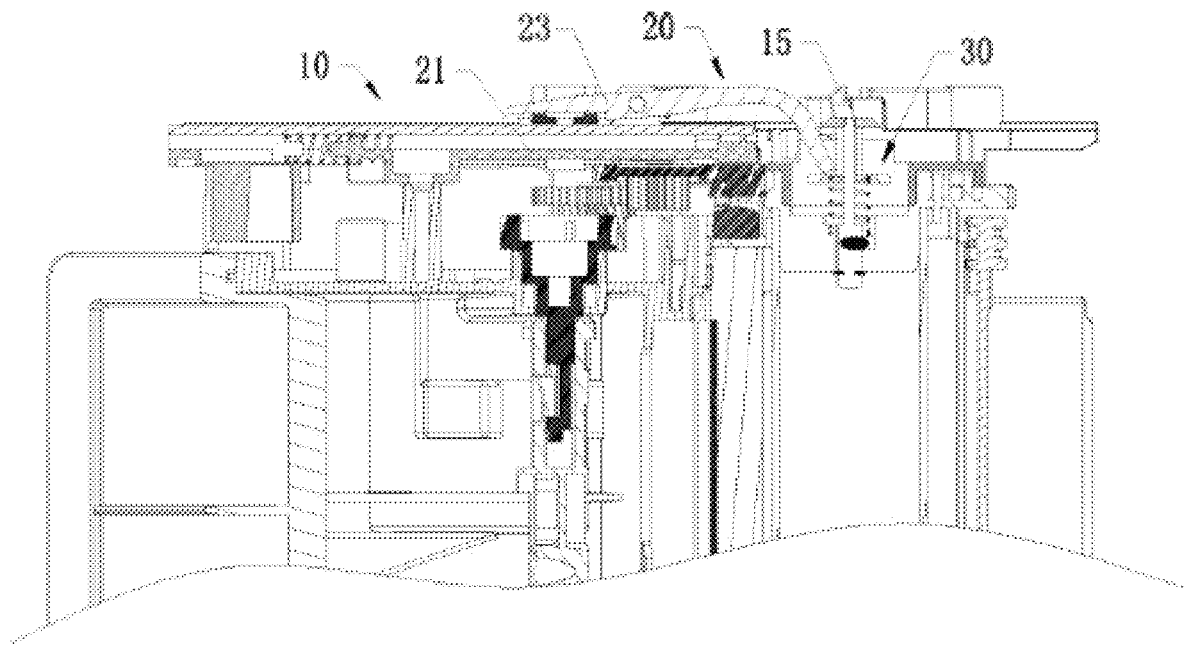
FIG. 27 is a cross-sectional view of a process cartridge according to Embodiment 6 of the present invention.
Figure 28:
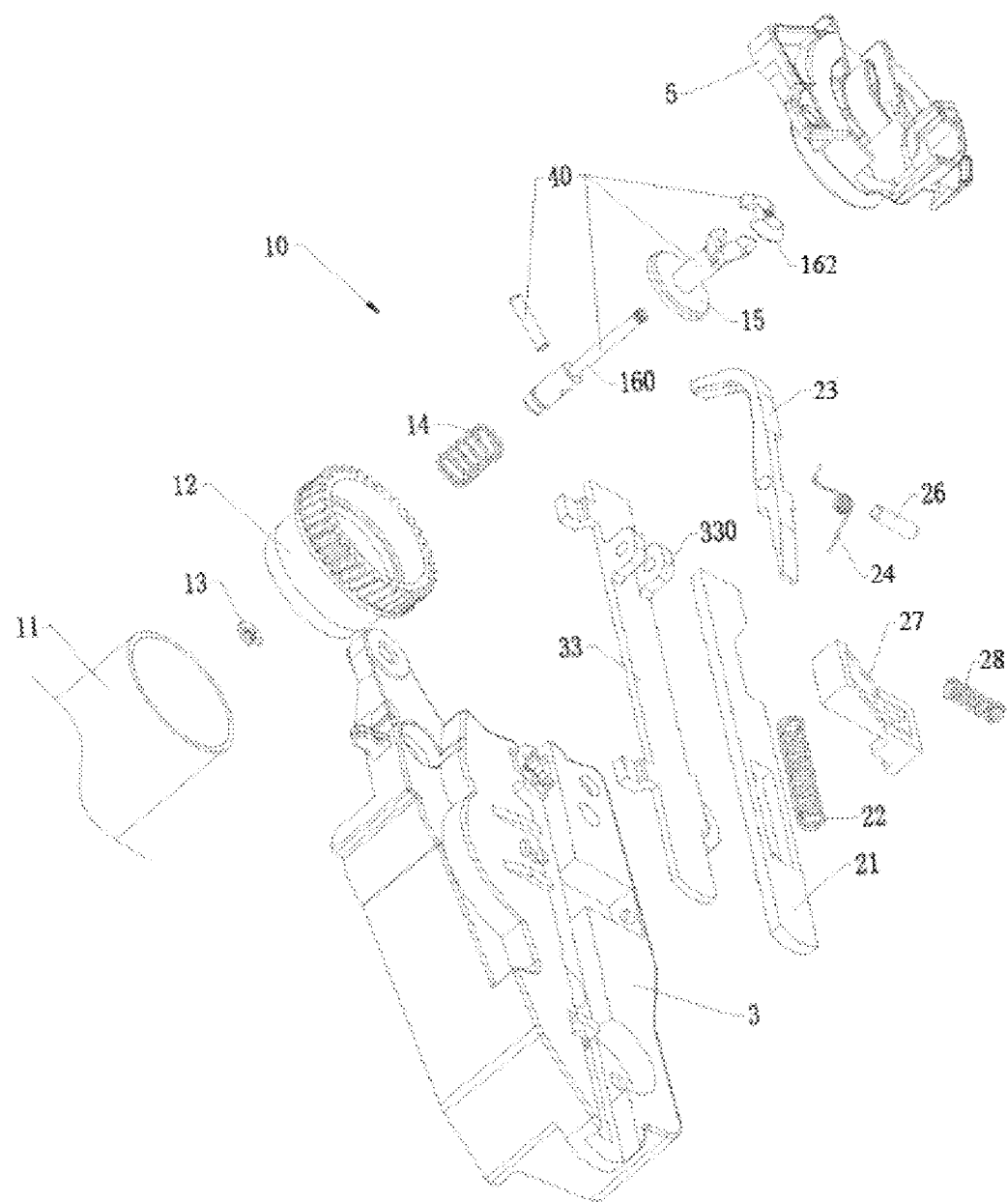
FIG. 28 is an exploded view of the process cartridge according to Embodiment 6 of the present invention.
Figure 29:
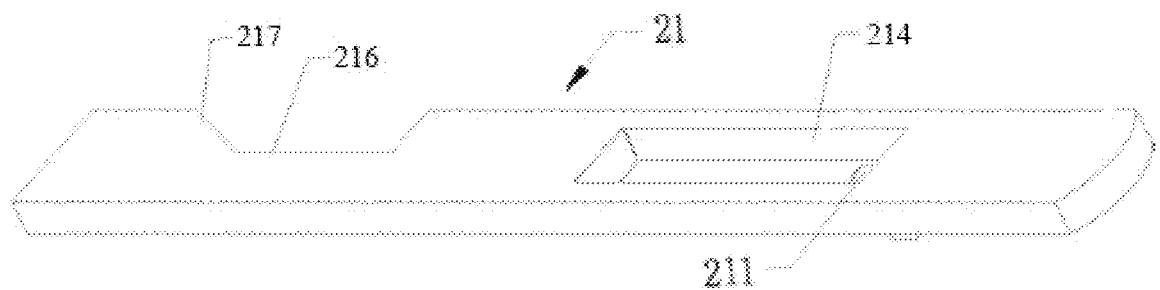
FIG. 29 is a structural schematic view of a pushing block according to Embodiment 6 of the present invention.

As illustrated in FIG. 27 to FIG. 29, the difference between this embodiment and the above described embodiments lies in the pushing device. The pushing device comprises a pushing rod 21, which is provided within the channel on the protective cover 3, with a second elastic element 22 which is in contact with the pushing rod 21 and the protective cover 3 respectively. Moreover, the protective cover 3 optionally comprises a barrier plate 33 for shading the channel of the protective cover 3, wherein the barrier plate 33 may be configured with supporting holes 330.

The pushing rod 21 comprises a first end for contacting the cover of the image forming apparatus and a second end opposite to the first end, wherein a slot 214 is configured above the first end, and a projection 211 is located inside the slot. The pushing rod 21 is substantially strip-shaped. A concave surface 216 is configured near the second end, wherein a slant surface 217 extends among the concave surface 216 and the second end.

At the initial position as shown in FIG. 17 (before the process cartridge being mounted to or removed from the image forming apparatus), the first end of the pushing rod 21 extends out of the protective cover 3, while the plane surface at the second end of the pushing rod 21 is in contact with the supporting surface 273 at the backside of the sliding block 27 to overcome the force from the fourth elastic element 28, such that the pushing end (fourth end) 233 of the lever 23 is forced to move toward the gear 12 of photosensitive drum, and the convex portion 152 of the claw is thereby moved to a location being substantially parallel to the "I"-shaped element 162, thus the drive head 40 may be mounted in or removed out successfully.

In work state, the pushing rod 21 is forced by closing the cover of the image forming apparatus, to overcome the force of the second elastic element 22 so as to move toward the drive head 40. The sliding block 27 moves up under the force from the fourth elastic element 28, while the lever 23 moves down away from the gear 12 of photosensitive drum, under the force from the third elastic element 24, and the claw 15 moves away from the gear 12 of photosensitive drum too. The convex portion 152 of the claw 15 is located above the "I"-shaped element 162.

Optionally, a fool proof device is further provided for preventing the pushing rod 21 from being pushed into working state before installation, by providing a pin to secure the position of both the pushing rod 21 and the protective cover 3. Even if there is no fool proof device, the claw still can get back to the position being substantially parallel to the "I"-shaped element, under the force of the image forming apparatus that acts on the sliding block during installation.

Embodiment 7

Figure 30:
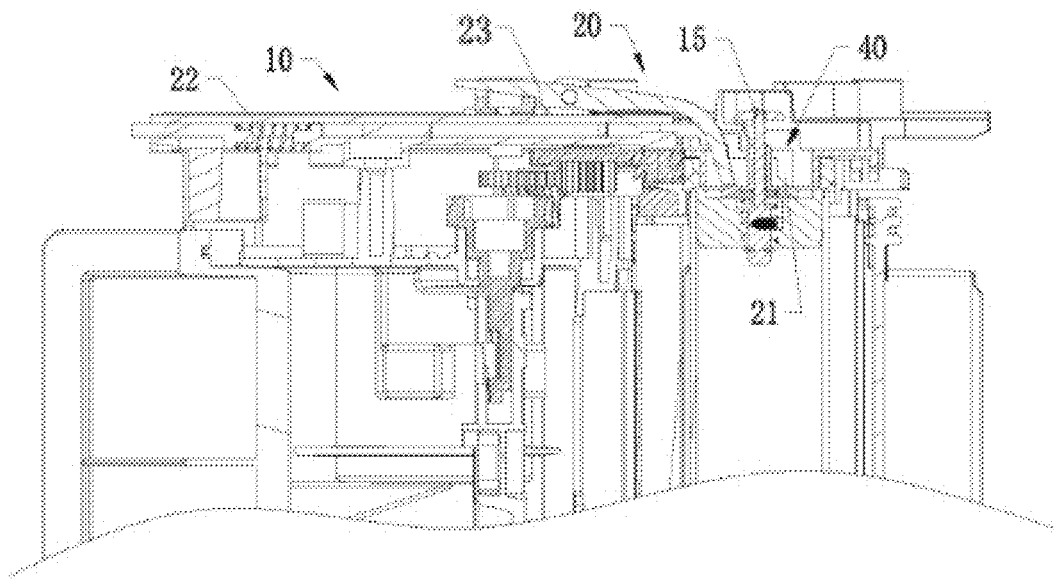
FIG. 30 is a cross-sectional view of a process cartridge according to Embodiment 7 of the present invention.
Figure 31:
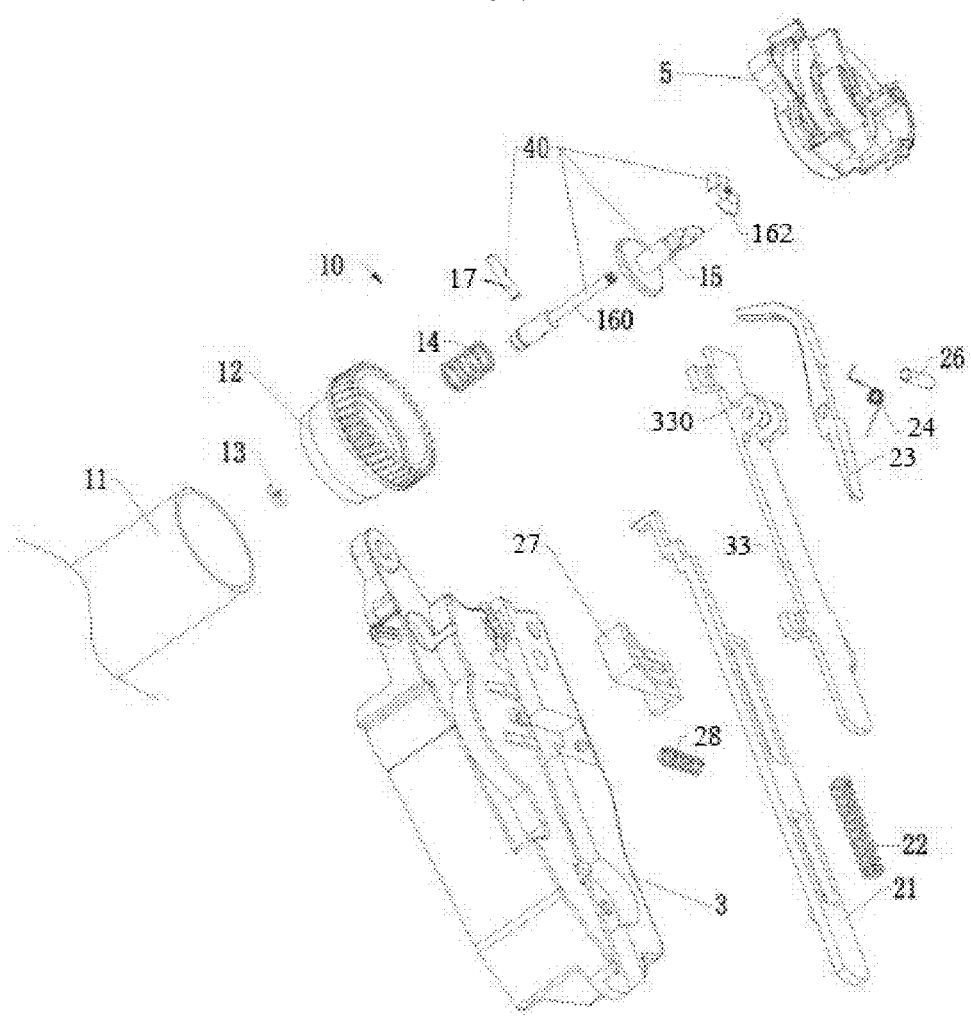
FIG. 31 is an exploded view of the process cartridge according to Embodiment 7 of the present invention.
Figure 32:
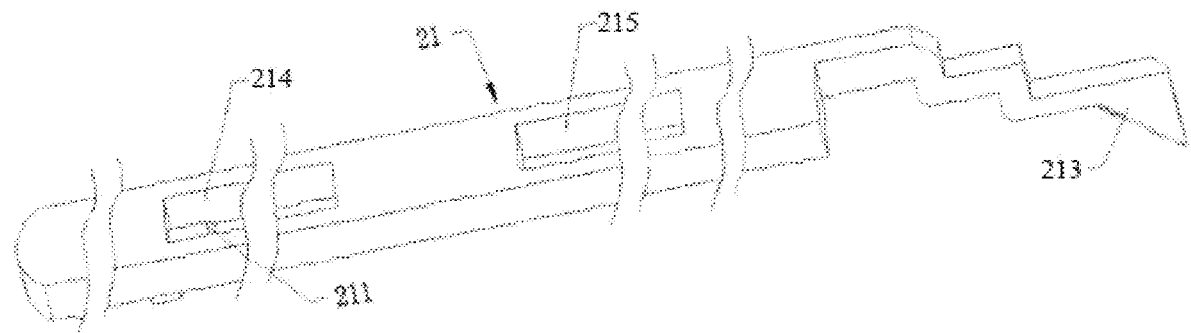
FIG. 32 is a structural schematic view of a pushing block according to Embodiment 7 of the present invention.

As illustrated in FIG. 30 to FIG. 32, the difference between this embodiment and the Embodiment 8 lies in the pushing device. Specifically, the pushing device comprises a first slot 214, a second slot 215, a first end and a second end. The first end is configured for receiving pushing force from a part of the image forming apparatus, such as a cover of the image forming apparatus. The second end is in contact with the supporting portion 150 of the claw 15 where an arc-shaped guiding surface is configured. The second elastic element 22, which is arranged in the first slot 214, is in contact with the pushing rod 21 and the protective cover 3 respectively. In normal state, the pushing rod 21 is forced to move toward the first end under the effect of the second elastic element 22, and the pushing rod 21 is forced to move toward the second end, after the first end receives a pushing force from the cover of the image forming apparatus and overcomes the force from the fourth elastic element 28.

A pushing block is used to control the claw for overcoming or receiving the force from the third elastic element, such that the claw may move up and down along the shaft part. The process cartridge is thereby mounted in to or removed out the image forming apparatus and a normal operation is achieved. The lever is used to overcome the engagement force between the claw and the drive head of the image forming apparatus, such that the drive assembly of photosensitive drum and process cartridge according to this embodiment can be removed from the image forming apparatus more easily.

Embodiment 8

Figure 33:
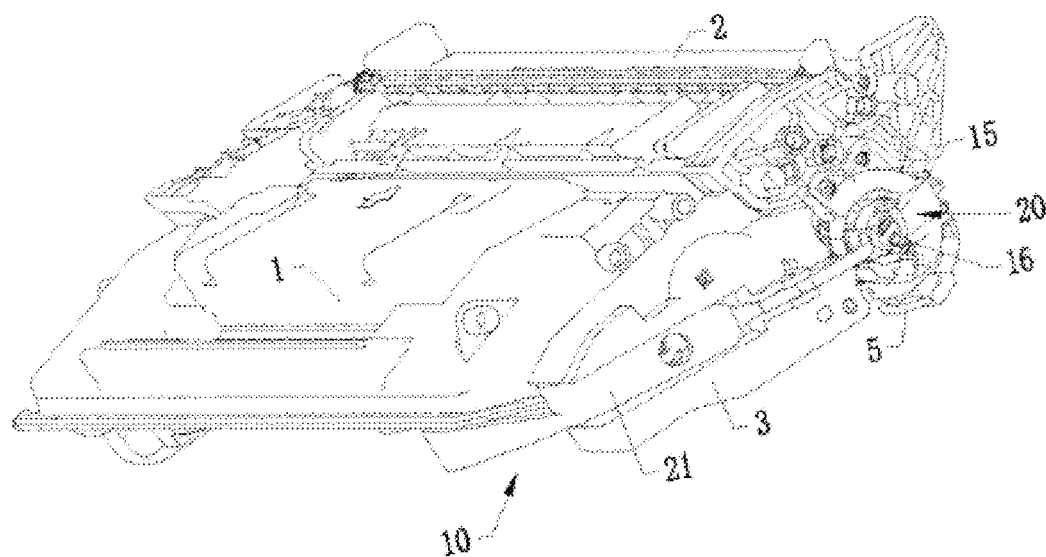
FIG. 33 is a schematic view illustrating a state of a process cartridge according to Embodiment 8 of the present invention.
Figure 34:
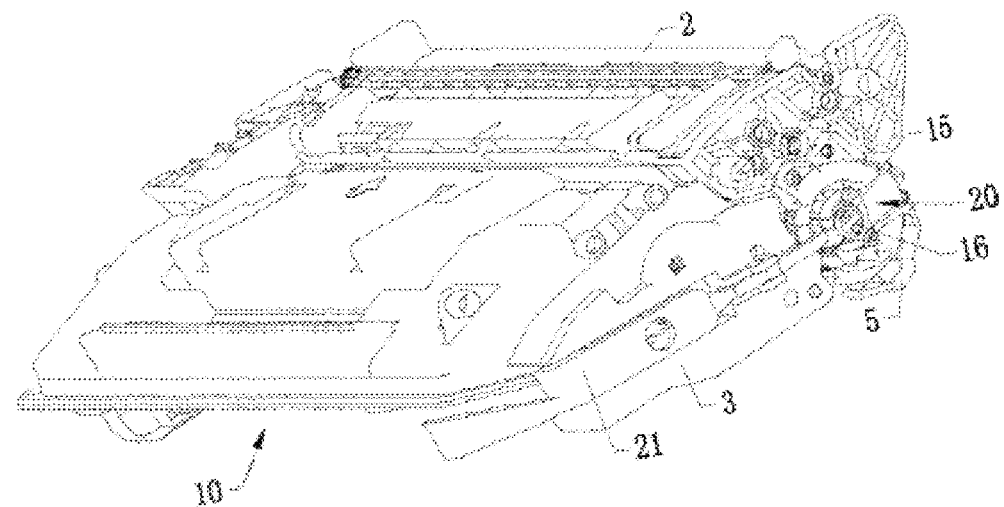
FIG. 34 is a schematic view illustrating another state of the process cartridge according to Embodiment 8 of the present invention.
Figure 35:
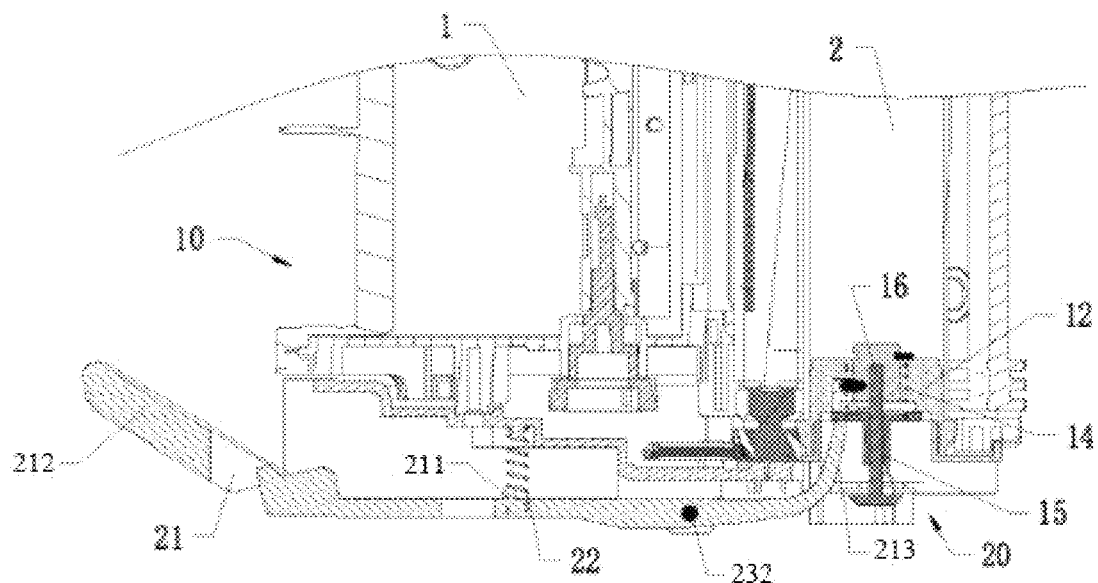
FIG. 35 is cross-sectional view of Embodiment 8 of the present invention.
Figure 36:
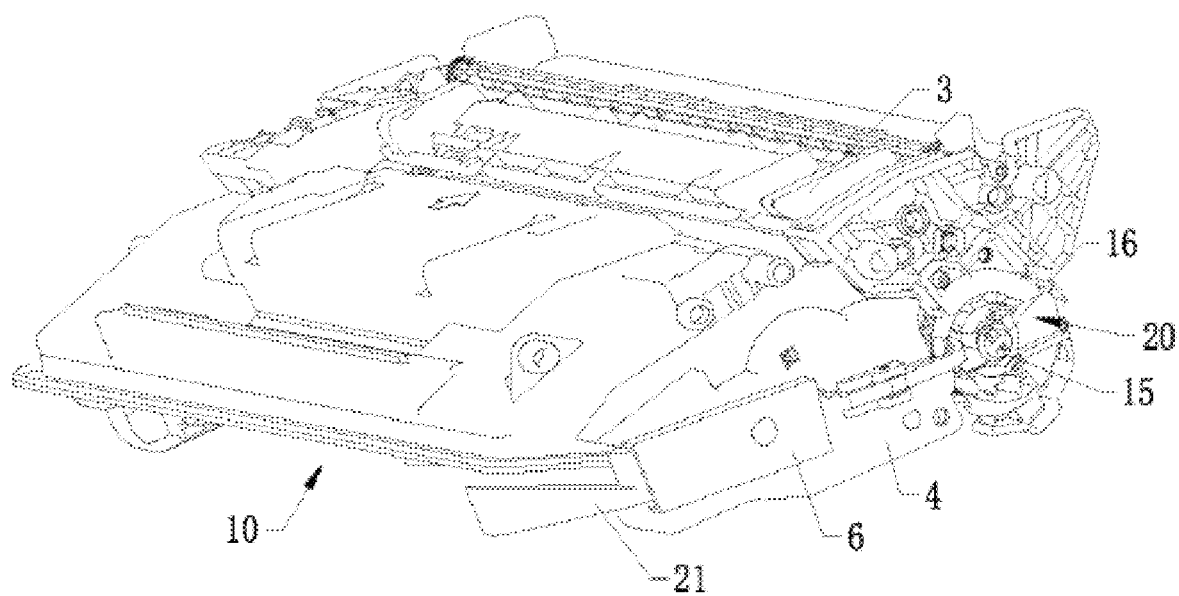
FIG. 36 is a structural schematic view illustrating a process cartridge being fitted with a baffle according to Embodiment 8 of the present invention.
Figure 37:
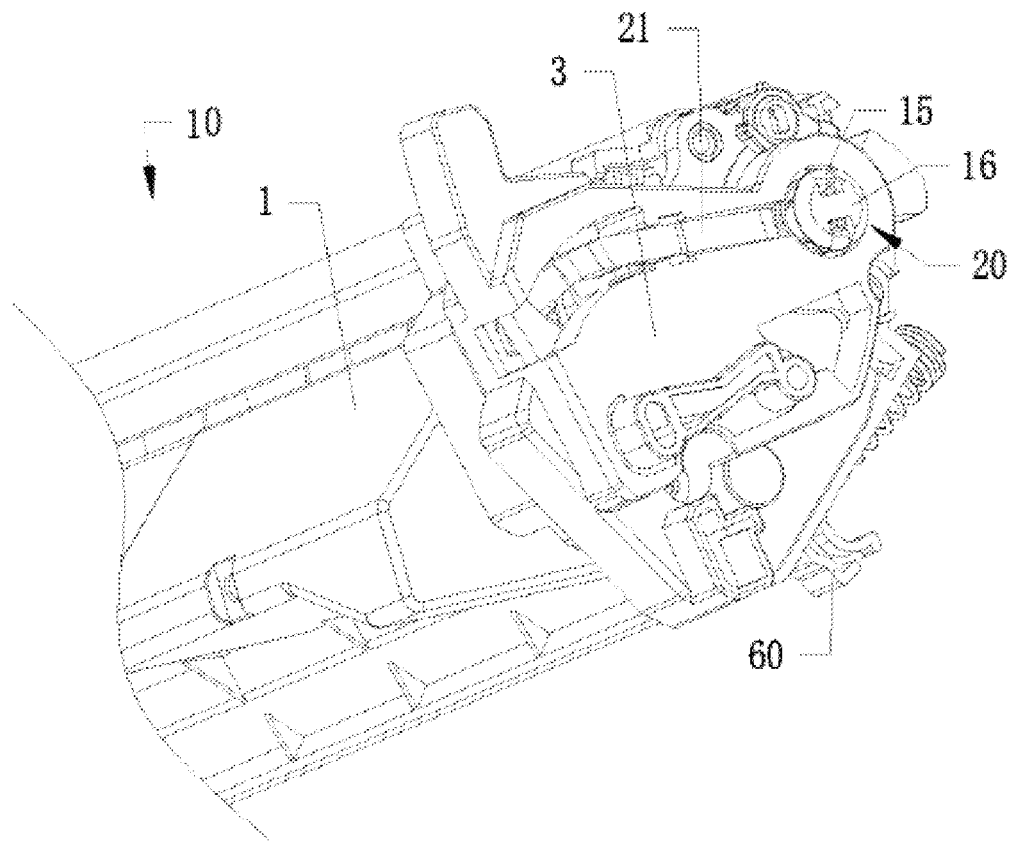
FIG. 37 illustrates a process cartridge according to Embodiment 9 of the present invention.
Figure 38:
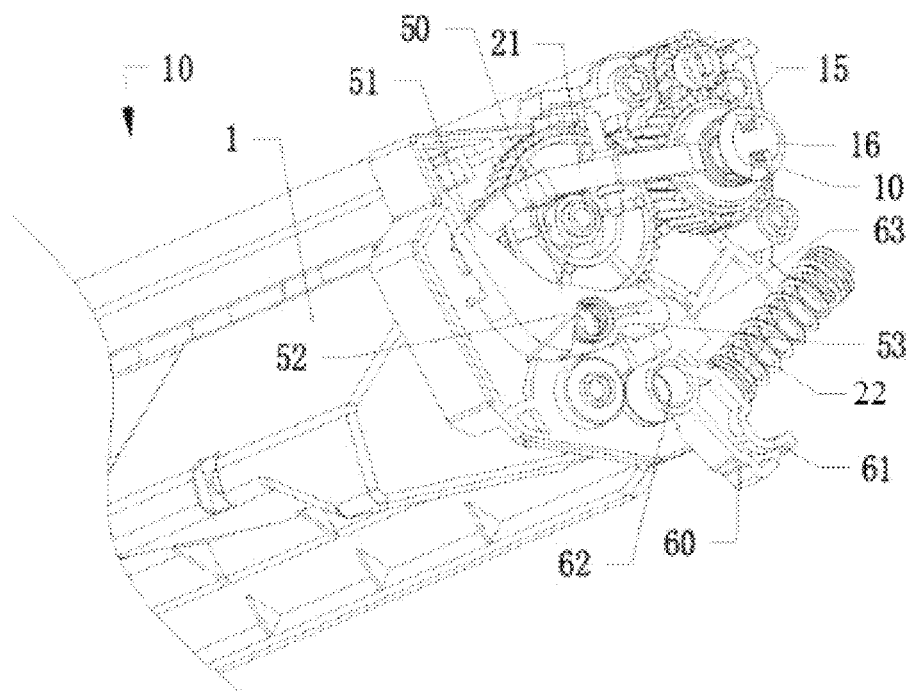
FIG. 38 is a schematic view illustrating a motion state of a process cartridge according to Embodiment 9 of the present invention.
Figure 39:
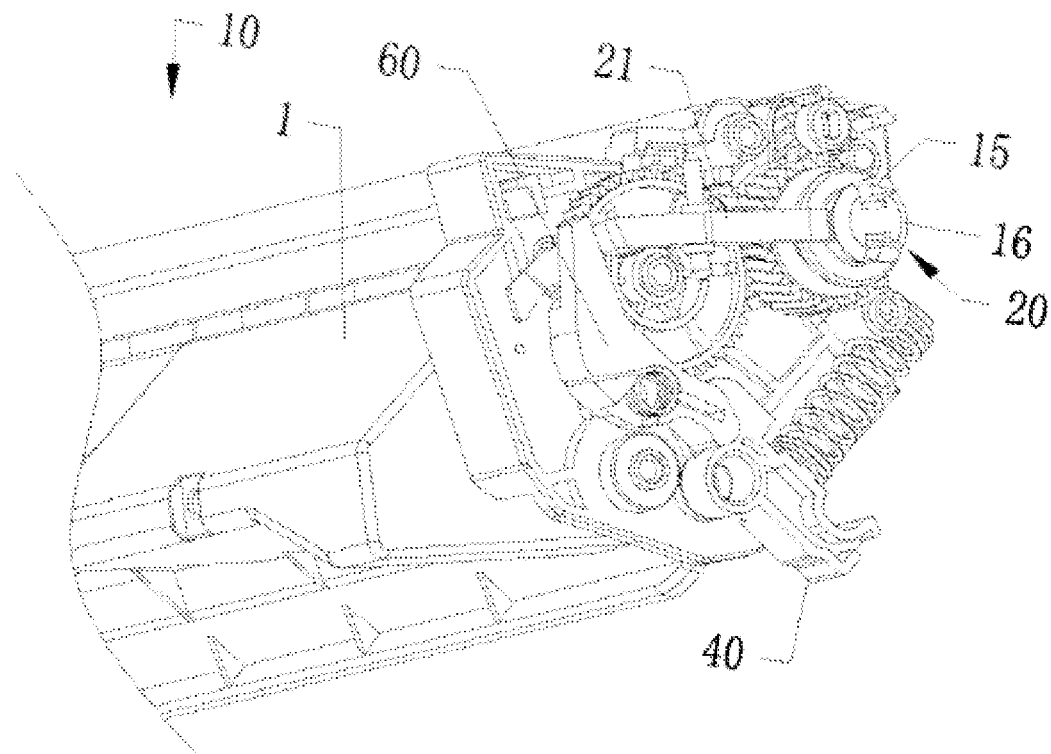
FIG. 39 is a schematic view illustrating another motion state of the process cartridge according to Embodiment 9 of the present invention.
Figure 40:
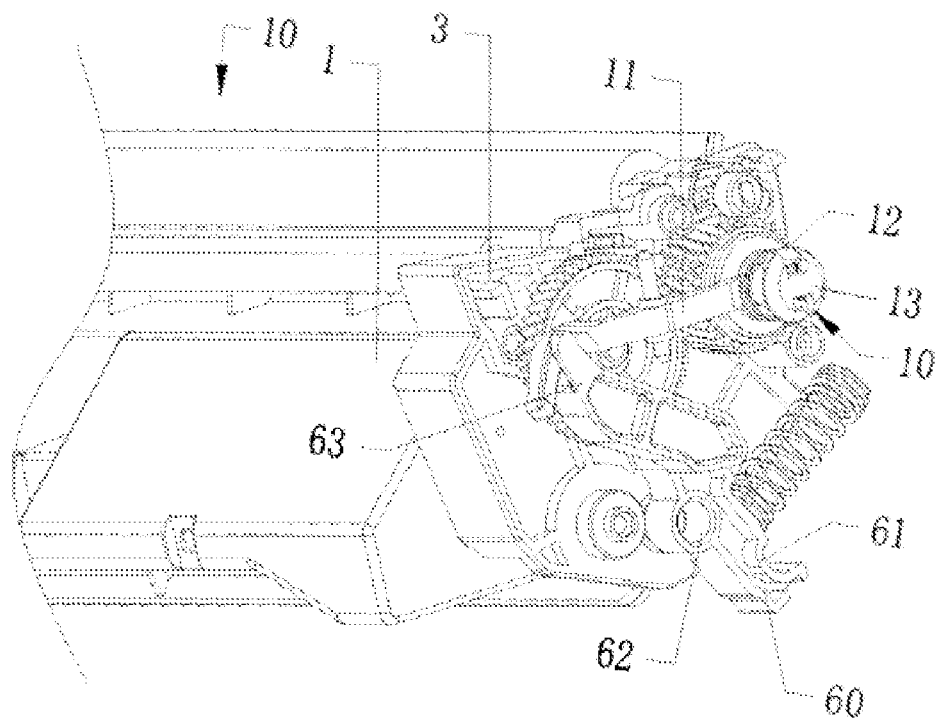
FIG. 40 is a structural schematic view of a process cartridge according to Embodiment 10 of the present invention.
Figure 41:
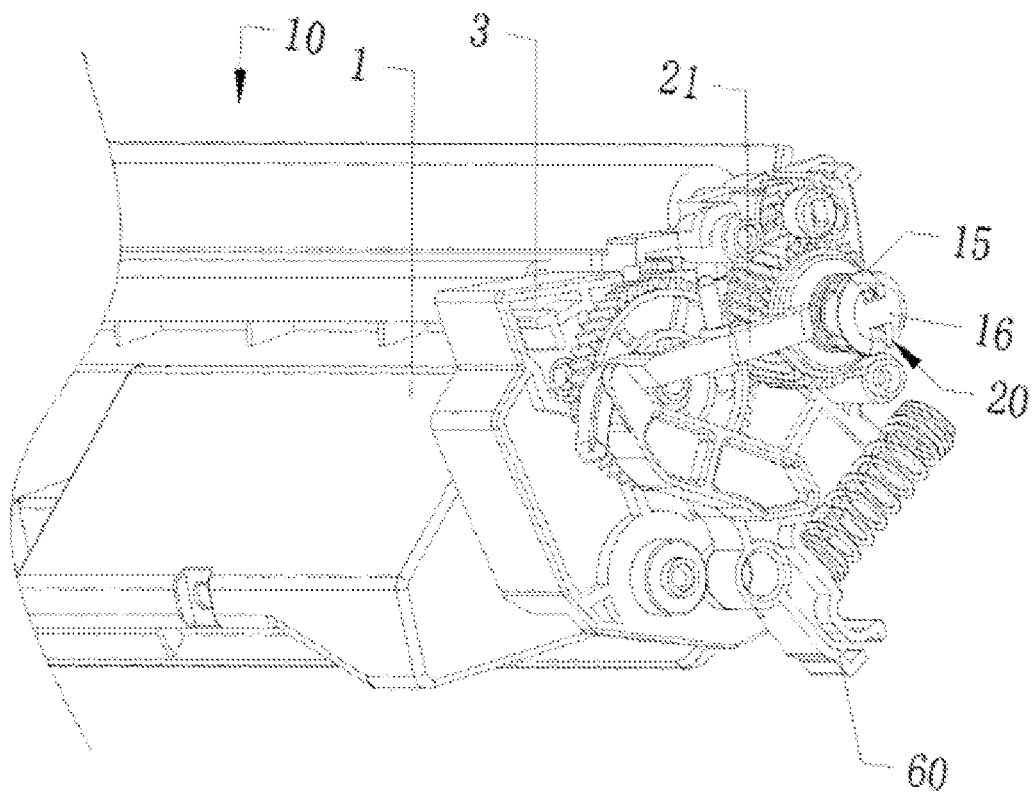
FIG. 41 is a schematic view illustrating a motion state of a process cartridge according to Embodiment 10 of the present invention.
Figure 42:
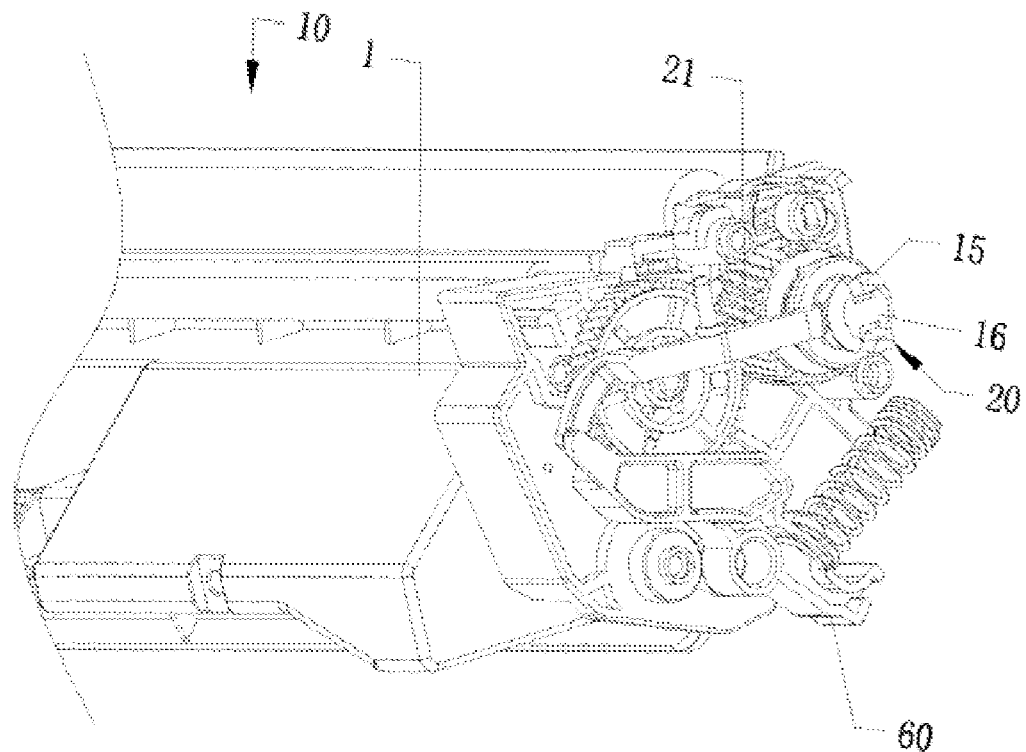
FIG. 42 is a schematic view illustrating another motion state of the process cartridge according to Embodiment 10 of the present invention.

As illustrated in FIG. 33 to FIG. 35, the difference between this embodiment and the above described embodiments lies in the pushing device. The drive assembly of photosensitive drum 20 comprises a drive head provided on the gear 12 of photosensitive drum and a pushing device provided on the protective cover 3. Specifically, the pushing device comprises a pushing rod 21 and a second elastic element 22.

The pushing rod 21 comprises a pushing end (first end) 212, a fulcrum (second hole) 232, and a force bearing end (second end) 213. The pushing rod 21 further comprises two bend portions, the pushing end (first end) 212 and the force bearing end (second end) 213 are respectively arranged at each end of the two bend portions. A projection 211 is provided between the fulcrum 232 and the pushing end (first end) 212. The projection 211 is configured with a second elastic element 22 which is in contact with the pushing rod 21 and the protective cover 3 respectively.

The distance from the edge of the pushing end (first end) 212 to the fulcrum 232 is defined as L1, and the distance from the force bearing end to the fulcrum 232 is defined as L2, wherein $L1/L2 \geq 2$.

The process cartridge in normal state according to this embodiment is illustrated in FIG. 33, where the claw is substantially parallel to the "T"-shaped element. FIG. 33 shows a work state of the drive assembly of photosensitive drum and the process cartridge, the pushing end (first end) 212 of the pushing rod 21 moves toward the process cartridge 10 under the action of the cover of the image forming apparatus, and the force bearing end (second end) 213 overcome the force from the second elastic element 22 and move away from the gear 12 of photosensitive drum, while the claw 15 moves away from the gear 12 of photosensitive drum under the force of the first elastic element 14, and the convex portion of the claw extend out of the "T"-shaped element.

Optionally, the protective cover 3 is further configured with a barrier plate 33 for covering the lever 23. The barrier plate 33 and the protective cover 3 may be fixed on one side of the process cartridge 10 by screw or snap lock.

Embodiment 9

The difference between this embodiment and the Embodiments 3-8 is that, the drive head is arranged on an intermediate gear, instead of a gear of photosensitive drum, besides, the structure of the pushing device is different. Specifically, the process cartridge according to this embodiment comprises a toner container 1, a protective cover 3, and a drive assembly 20, wherein the drive assembly comprises a pushing device and a drive head having a shaft part 16 and a claw 15 sleeving the shaft part 16. The claw 15 is forced by the pushing device to move up and down stretchably along the shaft part 16.

The protective cover 3 is configured for supporting the gear train and the drive assembly 20, wherein the gear train comprises an intermediate gear, a develop roller gear, and a supply roller gear, etc. The drive head is connected to the intermediate gear which is engaged with the develop roller gear and the supply roller gear respectively, such that the drive head receives a drive force from the image forming apparatus and transmit it to the develop roller gear and the supply roller gear.

The pushing device comprises a first pushing component 60, a second pushing component 50, a second elastic element 22, and a pushing rod 21. The first pushing component 60 abuts against the second pushing component 50, and the second pushing component 50 abuts against the pushing rod 21. The second pushing component 50 may be forced by the first pushing component 60 so as to force the pushing rod 21 to move, then forcing the drive head to stretch up and down.

The first pushing component 60 is rotationally arranged on the side wall of the toner container. The first pushing component 60 is configured with a shaft hole 62 centrally, and two ends (61, 63), wherein a hook is provided on the one end 61 in order to receive a drive force from the image forming apparatus and drive the first pushing component 60 to rotate. The drive force is at last transferred to the drive head via the first pushing component, the second pushing component 50 and the pushing rod 21.

The second pushing component 50 is rotationally arranged on the side wall of the toner container, and comprises an intermediate shaft hole 52 with two pushing ends (51, 53) that are in contact with the first pushing component 60 and the pushing rod 21 respectively. The second pushing component 50 is further configured with an elastic element for getting the second pushing component 50 back to the original position.

The pushing rod 21 comprises a fulcrum, a force bearing end, and a pushing end, wherein the force bearing end is in contact with the second pushing component, and the pushing component is connected with the drive head. An elastic element is further provided on the pushing rod.

The drive head comprises a first elastic element 14, a claw 15 and a shaft part 16 being sleeved by the claw 15. The claw 15 may move up and down stretchably along the shaft part 16. The drive head has been described in details in the Embodiment 1 and Embodiment 2.

The process cartridge according to the present embodiment requires a not-so-high precision and solves the problems in prior art that the drive head is easily falling off, by means of the configuration of the drive head and the pushing device wherein the claw is forced to move up and down along the shaft of the drive head under the action of the pushing device.

Embodiment 10

The same structures between this Embodiment and the Embodiment 9 will not be repeated here. Their difference is that, the pushing device comprises a first pushing component 60 and a pushing rod 21. The end 63 of the first pushing component is longer than the end 63 in Embodiment 9, and the pushing rod 21 is fitted on a position lower than its position in Embodiment 9.

The drive head, drive assembly, and the process cartridge according to the present invention requires a not-so-high precision and solves the problems in prior art that the drive head is easily falling off.

The above described elastic elements in various embodiments may be a spring, a compressed spring, a leaf spring, a plate spring, or any other element that is deformable, which should not be limited.

The drive head in above described embodiments is mounted to a gear of photosensitive drum or an intermediate gear, alternatively to a develop roller gear.

In the above embodiments, the change for the position of the claw is implemented by the pushing device according to the present invention configured with pushing rod, pushing component, and/or lever, wherein the pushing device is forced through the opening or closing of the cover, or through a pull force from the image forming apparatus. Alternatively, the pushing device in the present invention can be replaced with other known means, for example, an electromagnetic relay provided in the Chinese patent No. CN201310418996.3, or a pulling cord provided in the Chinese patent No. CN201310469314.1.

It should be understood that the above embodiments are explained for illustrating the technical solutions of the present invention but not for purposes of limitation. Although the disclosure has been described in detail with reference to the above embodiments. Any non-substantive, obvious alterations or improvement by the technician of this technical field according to the present invention may be incorporated into ambit of claims of the present invention.

What is claimed is:

1. A drive head mountable to a gear, the drive head comprising:
   a shaft part;
   a claw; and
   a first elastic element,
   wherein the shaft part is sleeved by the claw, which is configured to move along the shaft part,
   wherein the shaft part comprises an I-shaped element, a body and a first portion,
   wherein the claw comprises:
     a supporting portion;
     two convex portions; and
     a connecting portion,
   wherein the connecting portion connects the supporting portion and the two convex portions,
   wherein the supporting portion is in contact with the first elastic element and a through hole, which sleeves the body of the shaft part, is provided centrally in the claw and extends through the supporting portion and the connecting portion,
   wherein the shaft part comprises the body and the I-shaped element is provided at one end of the body,
   wherein the I-shaped element comprises two lugs connected by a connecting bar, and
   wherein a recess for receiving the connecting bar is provided at the one end of the connecting portion, close to at least one convex portion of the two convex portions.

2. The drive head of claim 1, wherein at least one convex portion of the two convex portions is provided with a guiding surface, and
   wherein a limit stop is provided with an acute angle.

3. The drive head of claim 1, wherein the claw comprises a supporting portion, a connecting portion and two convex portions, and
   wherein a recess is formed at one end of the connecting portion close to at least one convex portion of the at least two convex portions,
   wherein a ring connects the two convex portions at a top end thereof,
   wherein the shaft part comprises a body and a lug disposed at one end of the body, and
   wherein the lug is engageable with the recess.

4. The drive head of claim 3, wherein the two convex portions extend inwardly to form a protruding wall.

5. A drive assembly comprising the drive head of claim 1, wherein the drive head is mounted to a gear,
   wherein the drive assembly is removably mounted to a process cartridge comprising a protective cover, and the drive assembly comprises a pushing device and the claw abutting the pushing device, and
   wherein the pushing device is configured to force the claw to move along the shaft part.

6. The drive assembly of claim 5, wherein the pushing device comprises a pushing rod and a second elastic element, and
   wherein the second elastic element contacts the protective cover and the pushing rod.

7. The drive assembly of claim 6, wherein the pushing rod comprises a pushing end, a fulcrum and a force bearing end,
   wherein a distance between an edge of the pushing end and the fulcrum is L1, and a distance between an edge of the force bearing end and the fulcrum is L2, and
   wherein $L1/L2 \geq 2$.

8. A process cartridge, comprising the drive assembly of claim 5.

9. A process cartridge comprising a cartridge body, a protective cover, a gear train located under the protective cover,
   wherein the gear train comprises an intermediate gear, a develop roller gear and a supply roller gear,
   wherein the intermediate gear is configured to engage the develop roller gear and the supply roller gear, and
   wherein the process cartridge further comprises a drive head according with claim 1 connected to the intermediate gear.

10. The process cartridge of claim 9, further comprising a pushing device comprising a pushing block and a pushing rod connected thereto,
    wherein the pushing rod contacts the drive head, and the pushing block comprises a hook configured to receive a driving force.

11. The process cartridge of claim 10, wherein the pushing rod and the pushing block are each provided with at least one elastic element.

12. The process cartridge of claim 9, wherein the pushing block comprises a first pushing component, a second pushing component, and a pushing rod,
    wherein the second pushing component abuts the first pushing component and the pushing rod, and
    wherein the first pushing component comprises a hook configured to receive a driving force.

13. The process cartridge of claim 12, wherein the second pushing component and the pushing rod are each provided with at least one elastic element.

14. A process cartridge, comprising the drive assembly of claim 6.

15. A process cartridge, comprising the drive assembly of claim 7.

* * * * *